US012659992B2

(12) United States Patent
Hwang et al.

(10) Patent No.: US 12,659,992 B2
(45) Date of Patent: Jun. 16, 2026

(54) METHOD AND APPARATUS FOR TRANSMITTING AND RECEIVING DATA IN COMMUNICATION SYSTEM SUPPORTING MULTIPLE LINKS

(71) Applicants: ELECTRONICS AND TELECOMMUNICATIONS RESEARCH INSTITUTE, Daejeon (KR); KOREA NATIONAL UNIVERSITY OF TRANSPORTATION INDUSTRY-ACADEMIC COOPERATION FOUNDATION, Chungju-si (KR)

(72) Inventors: Sung Hyun Hwang, Daejeon (KR); Kyu Min Kang, Daejeon (KR); Jae Cheol Park, Daejeon (KR); Jin Hyung Oh, Sejong (KR); Dong Woo Lim, Daejeon (KR); Su Na Choi, Daejeon (KR); Yong Ho Kim, Incheon (KR); Han Seul Hong, Seoul (KR)

(73) Assignees: Electronics and Telecommunications Research Institute, Daejeon (KR); Korea National University of Transportation Industry-Academic Cooperation Foundation, Daejeon (KR)

( * ) Notice: Subject to any disclaimer, the term of this patent is extended or adjusted under 35 U.S.C. 154(b) by 681 days.

(21) Appl. No.: 17/916,406

(22) PCT Filed: Apr. 2, 2021

(86) PCT No.: PCT/KR2021/004130
§ 371 (c)(1),
(2) Date: Sep. 30, 2022

(87) PCT Pub. No.: WO2021/206378
PCT Pub. Date: Oct. 14, 2021

(65) Prior Publication Data
US 2023/0156795 A1    May 18, 2023

(30) Foreign Application Priority Data
Apr. 7, 2020    (KR) ........................ 10-2020-0041929
Nov. 2, 2020    (KR) ........................ 10-2020-0144533

(51) Int. Cl.
*H04W 74/0816*    (2024.01)
*H04W 84/12*      (2009.01)

(52) U.S. Cl.
CPC ........ *H04W 74/0816* (2013.01); *H04W 84/12* (2013.01)

(58) Field of Classification Search
CPC . H04W 74/0816; H04W 84/12; H04W 76/15; H04W 74/002; H04W 74/0808; H04W 74/0891; H04L 69/14
See application file for complete search history.

(56) References Cited

U.S. PATENT DOCUMENTS 8,705,562 B2    4/2014  Kim et al.
8,842,624 B2    9/2014  Trachewsky
(Continued)

FOREIGN PATENT DOCUMENTS

KR    10-2016-0022790 A    3/2016
KR       10-2054117 B1    12/2019
WO       2020/085824 A1    4/2020

OTHER PUBLICATIONS

Fischer, Matthew, "MLO Synchronous Transmission", doc.: IEEE 802.11-20/0081r1, Jan. 9, 2020.
(Continued)

*Primary Examiner* — Atique Ahmed
(74) *Attorney, Agent, or Firm* — Rabin & Berdo, P.C.

(57)                ABSTRACT

Disclosed are a method and apparatus for transmitting and receiving data in a communication system supporting mul-
(Continued)

tiple links. A method for operation of a first device comprises the steps of: transmitting, in a first link from among multiple links, a first RTS frame to a second device; receiving, from the second device in the first link, a first CTS frame that is a response to the first RTS frame; when the first CTS frame is received, transmitting, in the first link, a first data frame to the second device; and transmitting, in a second link during transmission of the first data frame, a second RTS frame to the second device.

8 Claims, 28 Drawing Sheets

(56)                References Cited

U.S. PATENT DOCUMENTS

| | | | | |
|---|---|---|---|---|
| 9,923,678 | B2 * | 3/2018 | Abeysekera | .......... H04L 5/0007 |
| 10,630,515 | B2 | 4/2020 | Kim et al. | |
| 11,375,544 | B2 | 6/2022 | Son et al. | |
| 2010/0182987 | A1 | 7/2010 | Shin et al. | |
| 2011/0249659 | A1 * | 10/2011 | Fontaine | ............... H04L 1/1607 |
| | | | | 370/338 |
| 2015/0327292 | A1 | 11/2015 | Morioka | |
| 2016/0212748 | A1 * | 7/2016 | Yang | ..................... H04L 1/1874 |
| 2016/0323853 | A1 * | 11/2016 | Kim | ...................... H04W 72/12 |
| 2016/0353357 | A1 * | 12/2016 | Asterjadhi | ........ H04W 74/0808 |
| 2018/0020476 | A1 | 1/2018 | Aijaz et al. | |
| 2018/0077725 | A1 * | 3/2018 | Sun | ......................... H04W 28/26 |
| 2018/0160459 | A1 * | 6/2018 | Cavalcante | ....... H04W 52/0229 |
| 2020/0314920 | A1 * | 10/2020 | Seok | ................. H04W 74/0808 |
| 2021/0282209 | A1 * | 9/2021 | Jiang | ................. H04W 74/0816 |
| 2022/0029771 | A1 | 1/2022 | Seok | |
| 2022/0053560 | A1 * | 2/2022 | Xin | ...................... H04W 74/085 |
| 2023/0017108 | A1 * | 1/2023 | Choi | ........................ H04L 69/28 |
| 2023/0126559 | A1 * | 4/2023 | Choi | ................. H04M 1/72454 |
| | | | | 455/575.3 |
| 2023/0156797 | A1 * | 5/2023 | Han | ................. H04W 74/0816 |
| | | | | 370/329 |
| 2023/0371077 | A1 * | 11/2023 | Zhou | ..................... H04W 76/28 |
| 2024/0073952 | A1 * | 2/2024 | Kim | ................. H04W 74/0816 |
| 2024/0215070 | A1 * | 6/2024 | Jang | ................. H04W 74/0816 |

OTHER PUBLICATIONS

Naribole, Sharan et al., "Multi-link Channel Access Discussion Follow-up", doc.: IEEE 802.11-19/1836r4, Nov. 11, 2019.
Seok, Yongho et al., "Legacy Performance Impact on Multi-Link Operation", doc.: IEEE 802.11-19/1546r0, Sep. 15, 2019.
Song, Taewon et al., "RTS/CTS for multi-link", doc.: IEEE 802. 11-20/0430r0, Mar. 22, 2020.

* cited by examiner

FIG. 4A

STA MLD
(STR operation)

first link second link time time

: PPDU transmission    : reception operation    : busy state

FIG. 4B

STA MLD
(STR operation)

first link second link time time

▨ : PPDU transmission  ▦ : reception operation  ▦ : busy state

FIG. 5A first link

Figure 5A:
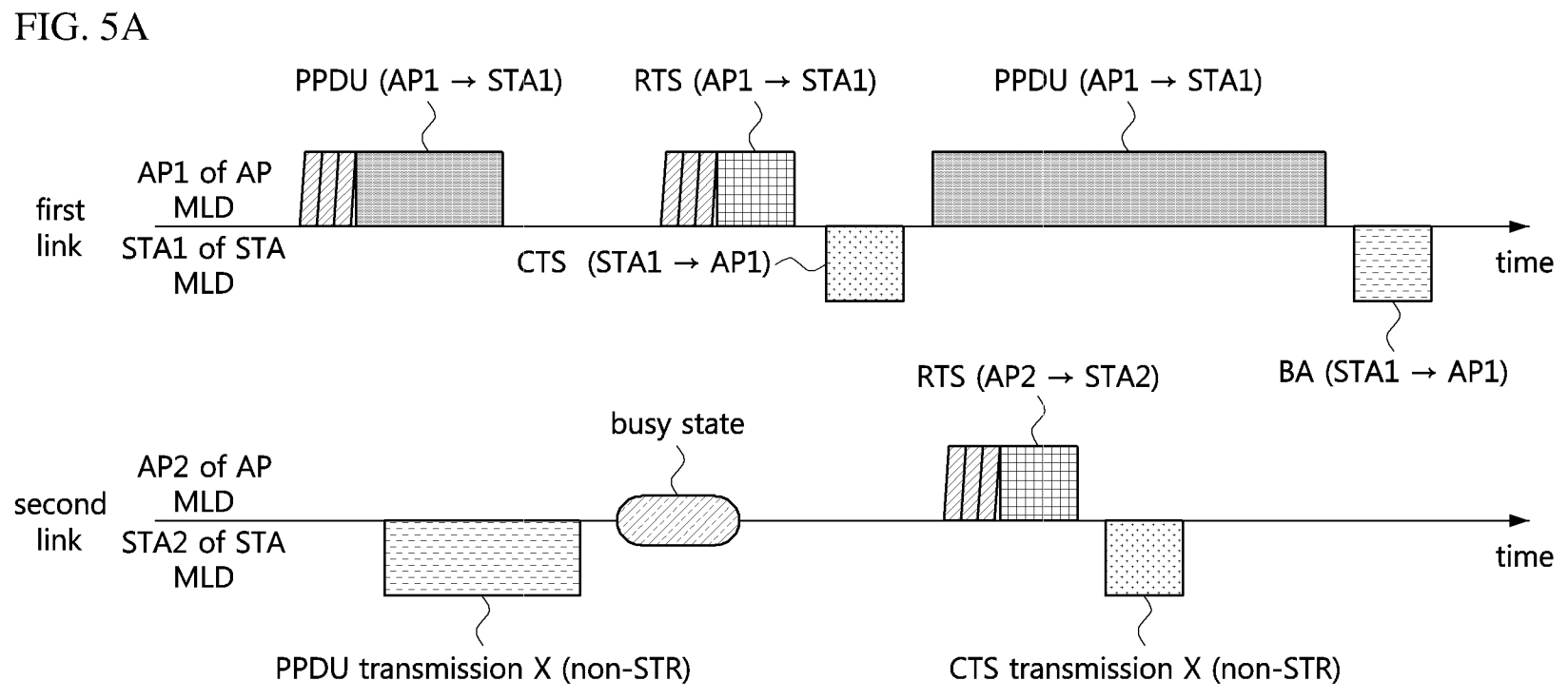

AP1 of AP MLD

STA1 of STA MLD

PPDU (AP1 → STA1)

RTS (AP1 → STA1)

PPDU (AP1 → STA1)

CTS (STA1 → AP1)

BA (STA1 → AP1)

time second link

AP2 of AP MLD

STA2 of STA MLD

RTS (AP2 → STA2)

busy state

PPDU transmission X (non-STR)

CTS transmission X (non-STR)

time

METHOD AND APPARATUS FOR TRANSMITTING AND RECEIVING DATA IN COMMUNICATION SYSTEM SUPPORTING MULTIPLE LINKS

TECHNICAL FIELD

The present disclosure relates to a wireless local area network communication technique, and more specifically, to a technique for transmitting and receiving data in a device not supporting simultaneous transmit and receive (STR).

BACKGROUND ART

Recently, as the spread of mobile devices expands, a wireless local area network technology capable of providing fast wireless communication services to mobile devices is in the spotlight. The wireless LAN technology may be a technology that supports mobile devices such as smart phones, smart pads, laptop computers, portable multimedia players, embedded devices, and the like to wirelessly access the Internet based on wireless communication technology.

The wireless LAN technology is being standardized as IEEE802.1 standards mainly in the Institute of Electrical and Electronics Engineers (IEEE). The initial version of the IEEE 802.11 standard can support a communication speed of 1 to 2 megabits per second (Mbps). The later versions of the IEEE802.11 have been being standardized in the direction of improving the communication speed.

The revised version of the IEEE 802.11a standard can support a communication speed of up to 54 Mbps by using Orthogonal Frequency Division Multiplexing (OFDM) technology in a 5 GHz band. The IEEE 802.11b standard can support a communication speed of up to 11 Mbps by using Direct Sequence Spread Spectrum (DSSS) technology in a 2.4 GHz band.

Due to the demand for further improved communication speeds, the IEEE 802.11n standard was developed to support High Throughput (HT) wireless LAN techniques. The OFDM technology can be supported in the IEEE 802.11n standard. and operating bands of the IEEE 802.11n may be the 2.4 GHz band and the 5 GHZ band. The IEEE 802.11n standard can provide an improved maximum communication speed by using a channel bandwidth extension technique and a multiple input multiple output (MIMO) technique. For example, when four spatial streams and a 40 MHz bandwidth are used in the IEEE 802.11n standard, the maximum communication speed of 600 Mbps can be supported.

As applications utilizing the above-described wireless LAN technologies are diversified according to the development and distribution of the WLAN technologies, a demand for a wireless LAN technology supporting a higher throughput has arisen. Accordingly, in the IEEE 802.11ac standard, an available frequency bandwidth (e.g., up to 'maximum of 160 MHz' or '80+80 MHz') has been extended, and the number of supportable spatial streams has increased. The IEEE 802.11ac standard may be a Very High Throughput (VHT) wireless LAN technology supporting a communication speed of 1 giga bits per second (Gbps) or more. The IEEE 802.11ac standard can support downlink transmission for a plurality of stations by using the MIMO technique.

As the demand for wireless LAN technologies further increases, the IEEE 802.11ax standard was developed to increase a spectral efficiency in a dense environment. Communication procedures according to the IEEE 802.11ax standard may be performed by using the multi-user (MU)

Orthogonal Frequency Division Multiple Access (OFDMA) technology. Uplink communication according to the IEEE 802.11 ax standard may be performed using the MU MIMO technology and/or OFDMA technology.

As applications requiring higher throughput and applications requiring real-time transmissions occur, the IEEE 802.11be standard that is an Extreme High Throughput (EHT) wireless LAN technology is being developed. The objective of the IEEE 802.11be standard may be to support a high throughput of 30 Gbps. The IEEE 802.11be standard can support a technology for reducing transmission delay. In addition, the IEEE 8021.11 be standard may support a further extended frequency bandwidth (e.g., 320 MHz bandwidth), multi-link transmission and aggregation operations including operations using multi-bands, transmission operations of a multi-access point (AP), and/or efficient retransmission operations (e.g., hybrid automatic repeat request (HARQ) operations).

However, since the multi-link operations are operations not defined in the existing wireless LAN standards, it may be required to define detailed operations according to an environment where the multi-link operations are performed. In particular, when two or more bands in which the multi-link operations are performed are adjacent, simultaneous transmit and receive operations through the multi-links may not be performed due to interferences between the adjacent bands (e.g., adjacent links) in one device. In particular, when a level of signal interference between the adjacent channels is equal to or higher than a certain level, a channel access operation (e.g., backoff operation) for transmission in another link cannot be performed due to the interference while performing a transmission operation in one link. Therefore, a method for multi-link operations may be required in the above-described situation.

Meanwhile, the prior arts of the present disclosure have been described to enhance understanding of the background of the present disclosure, and may include contents other than the prior arts already known to ordinary skilled persons in the field to which the present disclosure belongs.

DISCLOSURE

Technical Problem

An objective of the present disclosure for solving the above-described problem is directed to providing a method and an apparatus for transmitting and receiving data in a device not supporting simultaneous transmit and receive (STR) in a WLAN system supporting multi-links.

Technical Solution

An operation method of a first device according to a first exemplary embodiment of the present disclosure for achieving the objective may comprise: transmitting a first request-to-send (RTS) frame to a second device in a first link among the multi-links; receiving a first clear-to-send (CTS) frame from the second device in the first link, the first CTS frame being a response to the first RTS frame; in response to reception of the first CTS frame, transmitting a first data frame to the second device in the first link; and transmitting a second RTS frame to the second device in the second link while performing transmission of the first data frame.

Here, padding may be added to the second RTS frame so that an end time of the second RTS frame is identical to a transmission time of the first data frame.

Here, padding may be added to the first data frame so that an end time of the first data frame is identical to a transmission time of the second RTS frame.

Here, the operation method may further comprise: receiving a second CTS frame from the second device in the first link and the second link after a preconfigured period from an end time of the first data frame; transmitting a second data frame to the second device in the first link when the second CTS frame is received; and transmitting a third data frame to the second device in the second link when the second CTS frame is received.

Here, the second CTS frame may be a response frame for the second RTS frame.

Here, a reception time of the second CTS frame in the first link may be identical to a reception time of the second CTS frame in the second link, and the second data frame and the third data frame may be simultaneously transmitted.

Here, the first data frame, the second data frame, and the third data frame may be data frames into which one data frame is segmented.

Here, when the second data frame and the third data frame are transmitted through the multi-links, a transmit opportunity (TXOP) may be reconfigured, and a length of the reconfigured TXOP may be shorter than a length of the original TXOP.

Here, the operation method may further comprise transmitting a contention free (CF)-END frame indicating early termination of the original TXOP in the first link and the second link.

Here, the second may does not support simultaneous transmit and receive (STR) operations.

An operation method of a first device according to a second exemplary embodiment of the present disclosure for achieving the objective may comprise: transmitting a first request-to-send (RTS) frame to a second device in a first link among the multi-links; receiving a first clear-to-send (CTS) frame from the second device in the first link, the first CTS frame being a response to the first RTS frame; in response to reception of the first CTS frame, transmitting a first data frame to the second device in the first link; and when a channel access operation in the second link among the multi-link is completed before a transmission time of the first data frame, transmitting a second data frame to the second device in the second link without an RTS-CTS operation.

Here, a transmission operation from the first device to the second device may not be performed in a period from an end time of the channel access operation in the second link to a transmission time of the second data frame.

Here, the transmission time of the first data frame may be identical to a transmission time of the second data frame, and an end time of the first data frame may be identical to an end time of the second data frame.

Here, the operation method may further comprise transmitting a CTS-to-self frame to the second device in the second link before the transmission of the second data frame, wherein a transmission time of the CTS-to-self frame may be identical to the transmission time of the first data frame, and an end time of the first data frame may be identical to an end time of the second data frame.

Here, the operation method may further comprise transmitting a CTS-to-self frame to the second device in the second link before the transmission of the second data frame, wherein a transmission time of the CTS-to-self frame may be identical to a reception time of the first CTS frame, and the transmission time of the first data frame may be identical to a transmission time of the second data frame.

An operation method of a first device according to a third exemplary embodiment of the present disclosure for achieving the objective may comprise: performing a first channel access operation in a first link among the multi-links; performing a second channel access operation in a second link among the multi-links; and when the first channel access operation and the second channel access operation are completed, transmitting a request-to-send (RTS) frame to a second device in the first link and the second link.

Here, the operation method may further comprise: receiving a clear-to-send (CTS) frame from the second device in the first link and the second link, the CTS frame being a response to the RTS frame; and when the CTS frame is received, transmitting data frames to the second device in the first link and the second link, wherein transmission times of the data frames in the first link and the second link may be identical to each other.

Here, when a completion time of the first channel access operation is earlier than a completion time of the second channel access operation, transmission of the RTS frame in the first link may not be performed until the completion time of the second channel access operation.

Here, when a completion time of the second channel access operation is earlier than a completion time of the first channel access operation, transmission of the RTS frame in the second link may not be performed until the completion time of the first channel access operation.

Here, transmission times of the RTS frame in the first link and the second link may be identical to each other.

Advantageous Effects

According to the exemplary embodiments of the present disclosure, communication between devices (e.g., station, access point) may be performed using multi-links. When some links (e.g., some channels) among multi-links are adjacent to each other so that simultaneous transmit and receive (STR) operations cannot be performed, and a first station performs transmission using a first link among the multi-links, an access point may not be able to transmit a frame to a second station by using a second link among the multi-links. In this case, the transmission operation in the first link may be stopped, and the second station may transmit a response for a reception operation in the second link. By adjusting an execution time of the transmission operation, transmission efficiency can be improved.

DESCRIPTION OF DRAWINGS

FIG. 4A is a timing diagram illustrating a first exemplary embodiment of a channel access method in a wireless LAN system supporting multi-links.

FIG. 4B is a timing diagram illustrating a second exemplary embodiment of a channel access method in a wireless LAN system supporting multi-links.

FIG. 5A is a timing diagram illustrating a first exemplary embodiment of a method of transmitting and receiving a data frame in a wireless LAN system supporting multi-links.

FIG. 5B is a timing diagram illustrating a second exemplary embodiment of a method of transmitting and receiving a data frame in a wireless LAN system supporting multi-links.

FIG. 6B is a timing diagram illustrating a fourth exemplary embodiment of a method of transmitting and receiving a data frame in a wireless LAN system supporting multi-links.

FIG. 7A is a timing diagram illustrating a fifth exemplary embodiment of a method of transmitting and receiving a data frame in a wireless LAN system supporting multi-links.

FIG. 7B is a timing diagram illustrating a sixth exemplary embodiment of a method of transmitting and receiving a data frame in a wireless LAN system supporting multi-links.

FIG. 7C is a timing diagram illustrating a seventh exemplary embodiment of a method of transmitting and receiving a data frame in a wireless LAN system supporting multi-links.

FIG. 8 is a conceptual diagram illustrating a second exemplary embodiment of a method for segmenting a PPDU in a WLAN system supporting multi-links.

FIG. 10B is a timing diagram illustrating an eleventh exemplary embodiment of a method of transmitting and receiving a data frame in a wireless LAN system supporting multi-links.

FIG. 11A is a timing diagram illustrating a twelfth exemplary embodiment of a method of transmitting and receiving a data frame in a wireless LAN system supporting multi-links.

FIG. 11B is a timing diagram illustrating a thirteenth exemplary embodiment of a method of transmitting and receiving a data frame in a wireless LAN system supporting multi-links.

FIG. 12 is a timing diagram illustrating a fourteenth exemplary embodiment of a method for transmitting and receiving a data frame in a wireless LAN system supporting multi-links.

FIG. 13 is a timing diagram illustrating a fifteenth exemplary embodiment of a method of transmitting and receiving a data frame in a wireless LAN system supporting multi-links.

FIG. 14 is a timing diagram illustrating a sixteenth exemplary embodiment of a method of transmitting and receiving a data frame in a wireless LAN system supporting multi-links.

FIG. 15 is a timing diagram illustrating a seventeenth exemplary embodiment of a method of transmitting and receiving a data frame in a wireless LAN system supporting multi-links.

FIG. 16A is a timing diagram illustrating an eighteenth exemplary embodiment of a method of transmitting and receiving a data frame in a wireless LAN system supporting multi-links.

FIG. 18 is a timing diagram illustrating a twenty-first exemplary embodiment of a method of transmitting and receiving a data frame in a wireless LAN system supporting multi-links.

MODES OF THE INVENTION

Figure 1:
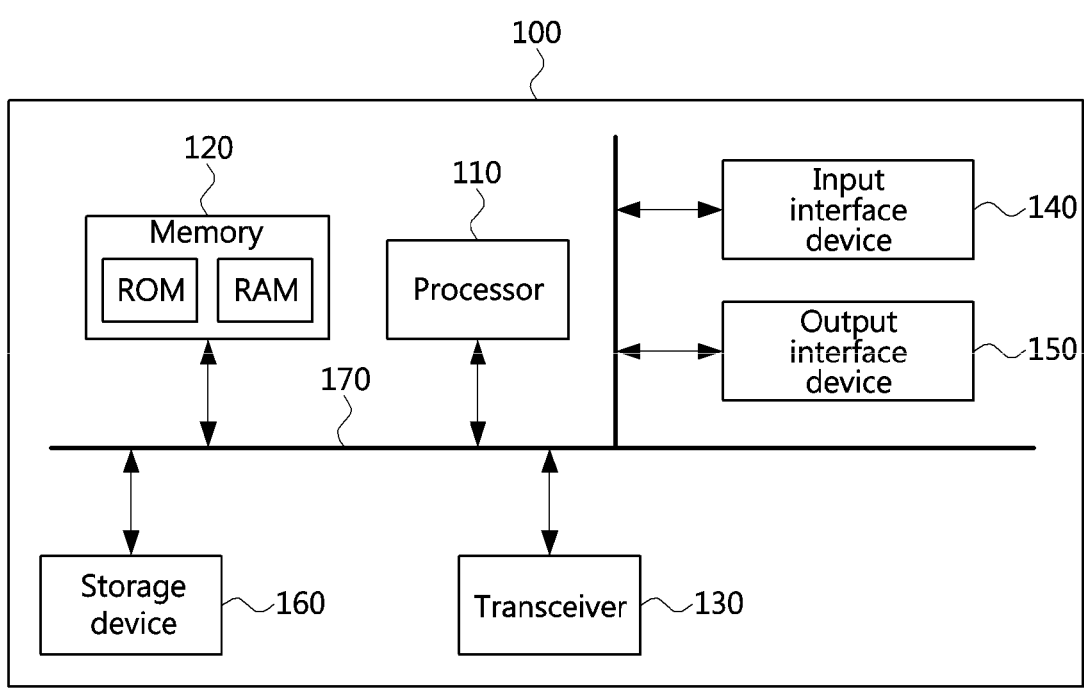
FIG. 1 is a block diagram illustrating a first exemplary embodiment of a communication node constituting a wireless LAN system.

While the present disclosure is susceptible to various modifications and alternative forms, specific embodiments are shown by way of example in the drawings and described in detail. It should be understood, however, that the description is not intended to limit the present disclosure to the specific embodiments, but, on the contrary, the present disclosure is to cover all modifications, equivalents, and alternatives that fall within the spirit and scope of the present disclosure.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present disclosure. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present disclosure pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present disclosure will be described in detail with reference to the accompanying drawings. In describing the present disclosure, to facilitate the entire understanding, like numbers refer to like elements throughout the description of the figures and the repetitive description thereof will be omitted.

In the following, a wireless communication network to which exemplary embodiments according to the present disclosure are applied will be described. The wireless communication network to which the exemplary embodiments according to the present disclosure are applied is not limited to the contents described below, and the exemplary embodiments according to the present disclosure may be applied to various wireless communication networks.

FIG. 1 is a block diagram illustrating a first exemplary embodiment of a communication node constituting a wireless LAN system.

Referring to FIG. 1, a communication node 100 may be an access point, a station, an access point (AP) multi-link device (MLD), or a non-AP MLD. The access point may refer to an AP, and the station may refer to a STA or a non-AP STA. The operating channel width supported by the access point may be 20 megahertz (MHz), 80 MHz, 160 MHz, or the like. The operating channel width supported by the station may be 20 MHz, 80 MHz, or the like.

The communication node 100 may include at least one processor 110, a memory 120, and a transceiver 130 connected to a network to perform communications. The transceiver 130 may be referred to as a transceiving device, a radio frequency (RF) unit, an RF module, or the like. In addition, the communication node 100 may further include an input interface device 140, an output interface device 150, a storage device 160, and the like. The components included in the communication node 100 may be connected by a bus 170 to communicate with each other.

However, the respective components included in the communication node 100 may be connected through individual interfaces or individual buses centering on the processor 110 instead of the common bus 170. For example, the processor 110 may be connected to at least one of the memory 120, the transceiver 130, the input interface device 140, the output interface device 150, and the storage device 160 through a dedicated interface.

The processor 110 may execute at least one instruction stored in at least one of the memory 120 and the storage device 160. The processor 110 may refer to a central processing unit (CPU), a graphics processing unit (GPU), or a dedicated processor on which the methods according to the exemplary embodiments of the present invention are performed. Each of the memory 120 and the storage device 160 may be configured as at least one of a volatile storage medium and a nonvolatile storage medium. For example, the memory 120 may be configured with at least one of a read only memory (ROM) and a random access memory (RAM).

Figure 2:
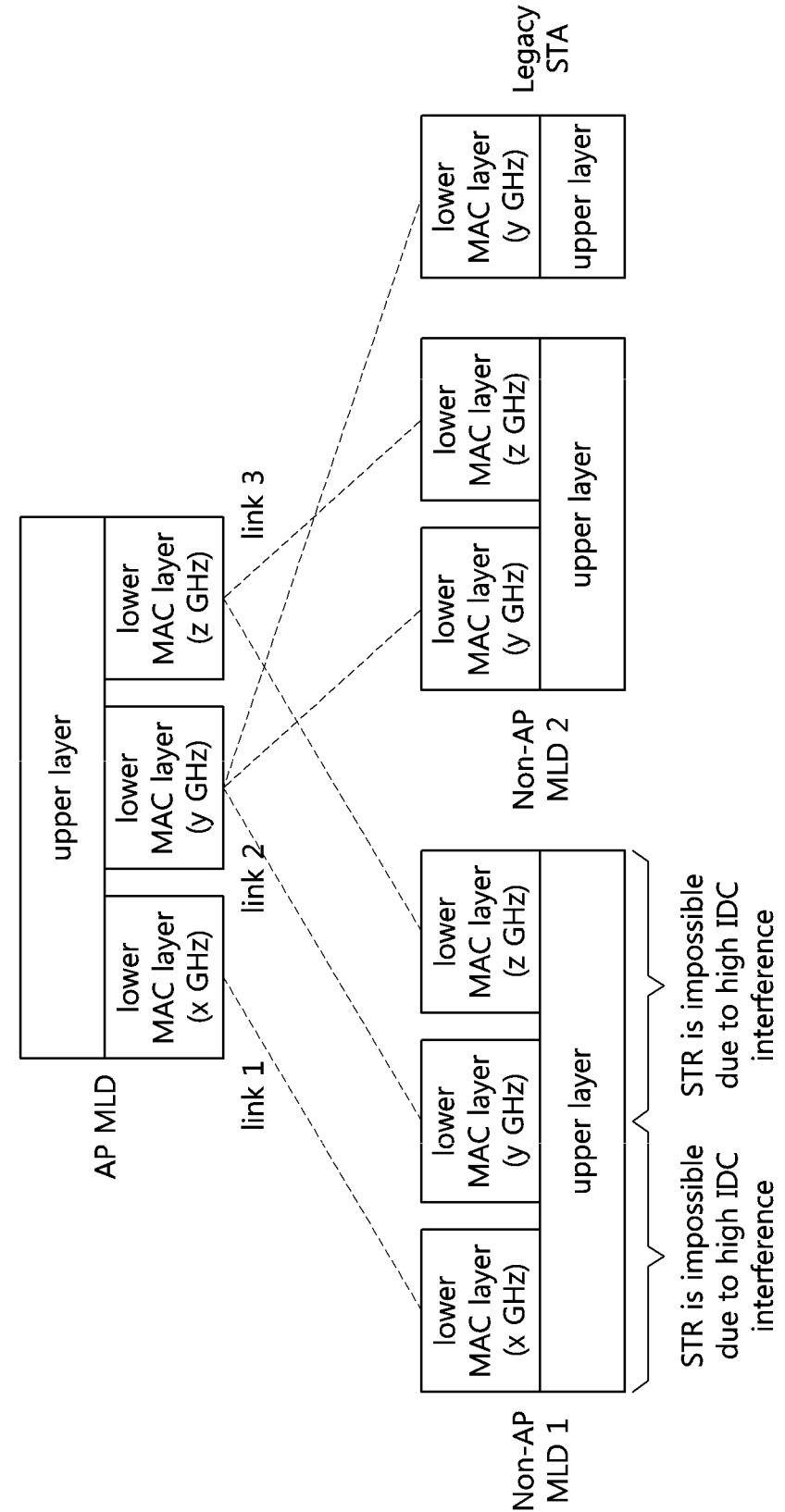
FIG. 2 is a conceptual diagram illustrating a first exemplary embodiment of multi-links configured between MLDs.

FIG. 2 is a conceptual diagram illustrating a first exemplary embodiment of multi-links configured between MLDs.

Referring to FIG. 2, a MLD may have one medium access control (MAC) address. In exemplary embodiments, the MLD may refer to an AP MLD and/or a non-AP MLD. The MAC addresses of the MLDs may be used in a multi-link setup procedure between the non-AP MLD and the AP MLD. The MAC address of the AP MLD may be different from the MAC address of the non-AP MLD. Access point(s) associated with the AP MLD may have different MAC addresses, and station(s) associated with the non-AP MLD may have different MAC addresses. Each of the access points within the AP MLD having different MAC addresses may be responsible for each link and may function as an independent AP.

Each of the stations within the non-AP MLD having different MAC addresses may be responsible for each link and may function as an independent STA. The non-AP MLD may also be referred to as a STA MLD. The MLD may support simultaneous transmit and receive (STR) operations. In this case, the MLD may perform a transmission operation in a link 1 and a reception operation in a link 2. The MLD supporting STR operations may be referred to as a STR MLD (e.g., STR AP MLD, STR non-AP MLD). In exemplary embodiments, a link may refer to a channel or a band. A device that does not support STR operations may be referred to as a non-STR (NSTR) AP MLD or a NSTR non-AP MLD (or NSTR STA MLD).

The MLD may transmit and receive frames in multi-links by using a non-continuous bandwidth extension scheme (e.g., 80 MHz+80 MHz). The multi-link operation may include multi-band transmission. The AP MLD may include a plurality of APs, and the plurality of APs may operate in different links. Each of the plurality of access points may perform function(s) of a lower MAC layer. Each of the plurality of access points may be referred to as a 'communication node' or 'lower entity'. The communication node (i.e., access point) may operate under controls of an upper layer (or, processor 110 shown in FIG. 1). The non-AP MLD may include a plurality of stations, and the plurality of stations may operate in different links. Each of the plurality of stations may be referred to as a 'communication node' or 'lower entity'. The communication node (i.e., station) may operate under controls of an upper layer (or, processor 110 shown in FIG. 1).

The MLD may perform communication in multi-bands. For example, the MLD may perform communication using an 40 MHz bandwidth according to a channel extension scheme (e.g., bandwidth extension scheme) in a 2.4 GHz band, and perform communication using a 160 MHz bandwidth according to a channel extension scheme in a 5 GHz band. The MLD may perform communication using a 160 MHz bandwidth in the 5 GHz band and a 160 MHz bandwidth in a 6 GHz band. One frequency band (e.g., one channel) used by the MLD may be defined as one link. Alternatively, a plurality of links may be configured in one frequency band used by the MLD. For example, the MLD may configure one link in the 2.4 GHz band and two links in the 6 GHz band. Each link may be referred to as a first link, a second link, a third link, or the like.

The MLD (e.g., AP MLD and/or non-AP MLD) may configure multi-links by performing an access procedure and/or a negotiation procedure for the multi-link operations. In this case, the number of links and/or links to be used among the multi-links may be configured. The non-AP MLD (e.g., station) may identify information on a band capable of communicating with the AP MLD. In the negotiation procedure for the multi-link operations between the non-AP MLD and the AP MLD, the non-AP MLD may be configured to use one or more links among the links supported by the AP MLD for the multi-link operations. A station that does not support the multi-link operations (e.g., IEEE 802.11a/b/g/n/ac/ax station) may be connected to one or more links among the links supported by the AP MLD.

If a band interval between the multi-links (e.g., a band interval between the link 1 and the link 2 in the frequency domain) is sufficient, the MLD may perform STR operations. For example, the MLD may transmit a physical layer convergence procedure (PLCP) protocol data unit (PPDU) 1 by using the link 1 among the multi-links, and may receive a PPDU 2 by using the link 2 among the multi-links. On the other hand, if the MLD performs STR operations when the band interval between the multi-links is not sufficient, in-device coexistence (IDC) interference, which is interference between the multi-links, may occur. Therefore, if the band interval between the multi-links is insufficient, the MLD may not be able to perform the STR operations.

For example, multi-links including a link 1, a link 2, and a link 3 may be configured between an AP MLD and a non-AP MLD 1. When a band interval between the link 1 and the link 3 is sufficient, the AP MLD may perform STR operations by using the links 1 and 3. That is, the AP MLD may transmit a frame using the link 1 and may receive a frame using the link 3. If a band interval between the link 1 and the link 2 is insufficient, the AP MLD may not be able to perform STR operations by using the links 1 and 2. If a band interval between the link 2 and the link 3 is insufficient, the AP MLD may not be able to perform STR operations by using the link 2 and the link 3.

Figure 3:
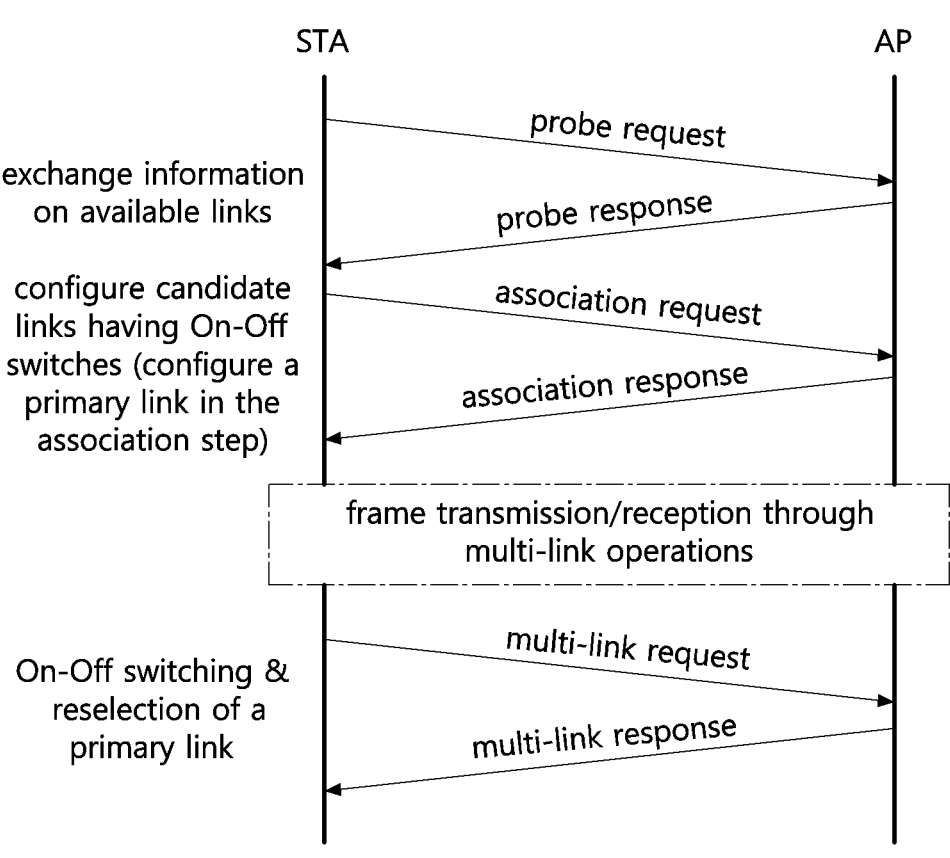
FIG. 3 is a sequence chart illustrating a first exemplary embodiment of a negotiation procedure for multi-link operations in a wireless LAN system.

FIG. 3 is a sequence chart illustrating a first exemplary embodiment of a negotiation procedure for multi-link operations in a wireless LAN system.

Referring to FIG. 3, an access procedure between a station and an access point in an infrastructure basic service set (BSS) may comprise a probe step of detecting an access point, an authentication step between the station and the detected access point, and an association step between the station and the authenticated access point.

In the probe step, the station may detect one or more access points using a passive scanning scheme or an active scanning scheme. When the passive scanning scheme is used, the station may detect one or more access points by overhearing beacon frame(s) transmitted by the one or more access points. When the active scanning scheme is used, the station may transmit a probe request frame, and one or more access points may be detected by receiving probe response frame(s) that are response(s) to the probe request frame from the one or more access points.

When one or more access points are detected, the station may perform the authentication step with the detected access point(s). In this case, the station may perform the authentication step with a plurality of access points. Authentication algorithms according to the IEEE 802.11 specification may be classified into an open system algorithm in which two authentication frames are exchanged, a shared key algorithm in which four authentication frames are exchanged, and the like.

The station may complete the authentication by transmitting an authentication request frame based on the authentication algorithm according to the IEEE 802.11 specification, and receiving an authentication response frame that is a response to the authentication request frame from the access point.

When the authentication with the access point is completed, the station may perform the association step with the access point. In this case, the station may select one of the access point(s) that performed the authentication step with itself, and may perform the association step with the selected access point. That is, the station may transmit an association request frame to the selected access point, and complete the association step with the selected access point by receiving an association response frame that is a response to the association request frame from the selected access point.

Meanwhile, multi-link operations may be supported in the wireless LAN system. The MLD may include one or more STAs associated with the MLD. The MLD may be a logical entity. The MLD may be classified into an AP MLD and a non-AP MLD. Each STA associated with the AP MLD may be an AP, and each STA associated with the non-AP MLD may be a non-AP STA. In order to configure multi-links, a multi-link discovery procedure, a multi-link setup procedure, and the like may be performed. The multi-link discovery procedure may be performed in the probe step between the station and the access point. In this case, a multi-link (ML) information element (IE) may be included in the beacon frame, the probe request frame, and/or probe response frame.

For example, in order to perform the multi-link operations, information indicating whether the multi-link operations can be performed between the access point (e.g., AP associated with the MLD) and the station (e.g., non-AP STA associated with the MLD) and information on available links may be exchanged in the probe step. In the negotiation procedure (e.g., multi-link setup procedure) for the multi-link operations, the access point and/or the station may transmit information on links to be used for the multi-link operation. The negotiation procedure for the multi-link operations may be performed in the access procedure (e.g., association step) between the station and the access point, and the information element(s) required for the multi-link operation may be configured and changed by an action frame in the negotiation procedure.

Further, in the access procedure (e.g., association step) between the station and the access point, available link(s) of the access point may be configured, and an identifier (ID) may be assigned to each link. Thereafter, in the negotiation procedure and/or change procedure for the multi-link operation, information indicating whether each link is activated may be transmitted, and the information may be expressed using a link ID.

The information indicating whether the multi-link operations can be performed may be transmitted and received in an exchange procedure of capability information elements (e.g., extremely high throughput (EHT) capability information elements) between the station and the access point. The capability information elements may include information on a supporting band(s), information on a supporting link(s) (e.g., IDs and/or number of supporting link(s)), information on links capable of STR operations (e.g., information on bands of the links, information on spacing between the links), and the like. In addition, the capability information element may include information individually indicating a link capable of STR operations.

Figure 4A:
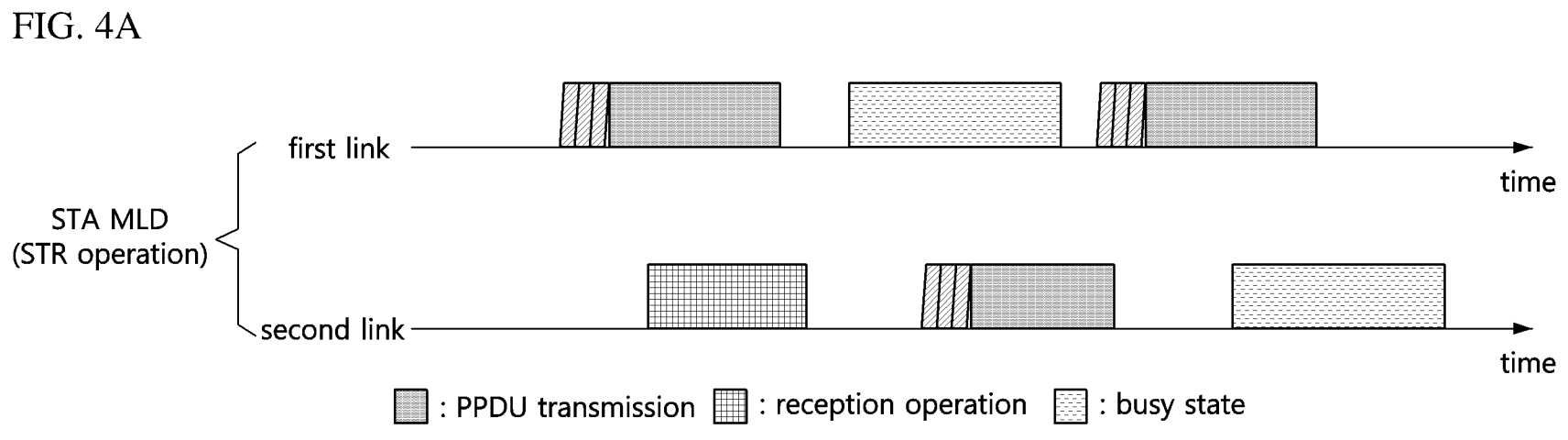
Figure 4B:
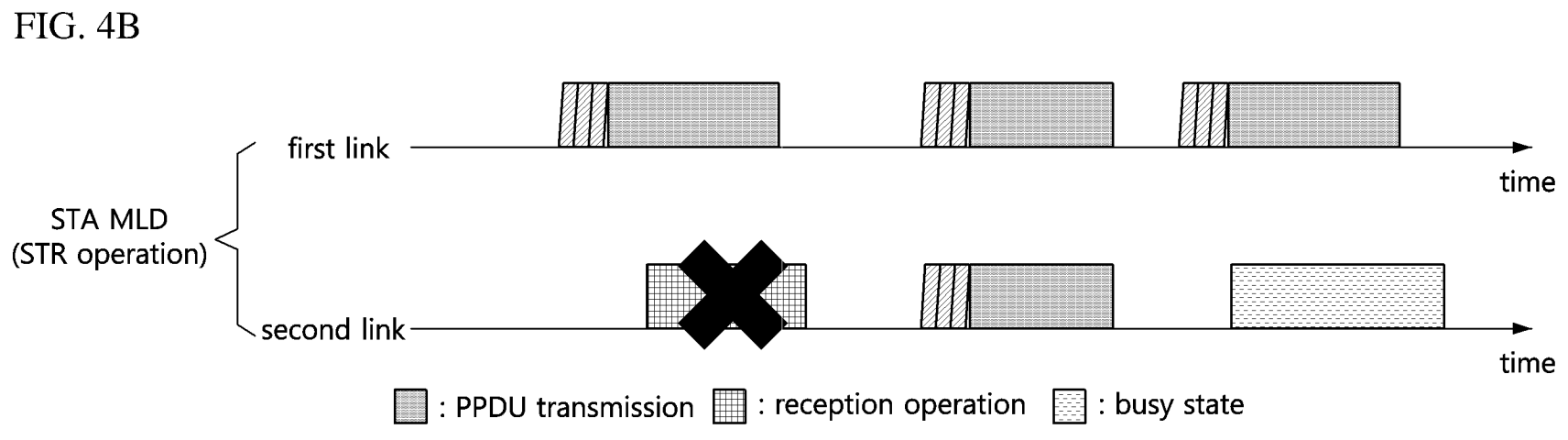

FIG. 4A is a timing diagram illustrating a first exemplary embodiment of a channel access method in a wireless LAN system supporting multi-links, and FIG. 4B is a timing diagram illustrating a second exemplary embodiment of a channel access method in a wireless LAN system supporting multi-links.

Referring to FIGS. 4A and 4B, when a band interval is sufficient in a plurality of links, a transmission operation in a first link and a reception operation in a second link may be simultaneously performed. Transmission operations using multi-links may be implemented in form of independent transmission for each link. The above-described transmission operation may be performed in a device (e.g., access point or station) capable of supporting Simultaneous Transmit and Receive (STR).

When an independent transmission scheme is used, a lower layer (e.g., physical (PHY) layer and/or MAC layer) may perform a channel access operation in each link (e.g., each of the first link and the second link) to transmit a frame (e.g., PDU) acquired from an upper layer. When a transmission opportunity (TXOP) is acquired by the channel access operation, the lower layer may transmit the frame within the corresponding TXOP.

The channel access operation may be a carrier sensing operation performed during an arbitration interframe space (AIFS) according to data included in the frame (e.g., access category (AC) of the data). The carrier sensing operation may also be referred to as 'channel sensing operation'. When it is determined that a channel (e.g., link) is in a busy state by the carrier sensing operation or when data frame transmission of another station is completed, the channel access operation may include 'carrier sensing operation in AIFS+ backoff operation'.

The carrier sensing operation may be classified into a physical carrier sensing operation and a virtual carrier sensing operation. The physical carrier sensing operation may be an energy detection (ED) operation that detects a reception power in an operating channel (e.g., operating link). The virtual carrier sensing operation may include a 'network allocation vector (NAV) setting operation based on a value of a length field included in a preamble of a frame (e.g., PPDU or MPDU) received from another station' and a 'NAV setting operation based on a duration field included in a MAC header of a frame received from another station and/or a value of a TXOP field included in a preamble thereof. The NAV setting operation may be an operation of configuring a parameter for configuring a transmission prohibition period or an operation of configuring the transmission prohibition period during a time when the terminal does not start transmission (i.e., a time when another terminal performs a transmission operation). A transmission time may be independent of a result of the physical channel sensing. The NAV setting operation may be an operation of configuring a period (e.g., busy period) in which a frame transmission is prohibited as long as a value of a duration field included in a MAC header of a frame transmitted by terminals within or outside a basic service set (BSS). When the virtual carrier sensing succeeds and the NAV is set, the period for which the NAV is set may be determined as a busy period without performing actual carrier sensing. When the independent transmission scheme is used, transmission times of frames in the links (e.g., link 1 and link 2) may not coincide. Since the channel access operation is performed independently in each of the links, the links may be used efficiently.

On the other hand, when a band interval is insufficient in a plurality of links, a transmission operation in the first link may cause interference to the second link of the same device. The above-described interference may be in-device coexistence interference (IDC). In exemplary embodiments, a device may refer to an MLD, an access point, and/or a station. When the IDC occurs, the STR operation may be impossible in the plurality of links. For example, when a device uses two links (e.g., first link and second link) operating in the 5 GHz band, if a spacing between the links is not sufficient, it may be impossible to simultaneously perform a transmission operation in the first link and a reception operation in the second link. Therefore, multi-link operations may not be implemented in the independent transmission scheme for each link. In this case, the multi-link operations may be implemented in a synchronized transmission scheme. In exemplary embodiments, the multi-link operation may refer to a 'transmission/reception operation using multi-links'.

When the synchronized transmission scheme is used, transmission start times and/or transmission end times of frames transmitted on the respective links may be configured to be the same. In order to match the transmission times of the frames equally in the multi-link operation based on the synchronized transmission scheme, if the lengths of the frames transmitted in the respective links are different, padding bit(s) may be added to a frame having a shorter length to match the lengths of the frames. When channel access operations for synchronized transmissions are performed, one primary link (e.g., first link) is configured, a backoff operation is performed in the primary link (e.g., second link), and a channel state of another link (e.g., secondary link) is an idle state from a specific time to a completion time (e.g., success time) of the backoff operation in the primary link, the device may perform transmission operations using the plurality of links (e.g., primary link and another link). The time from the specific time to the completion time of the backoff operation of the primary link may be a point coordination function (PCF) interframe space (PIFS), distributed coordination function (DCF) interframe space (DIFS), AIFS, or a whole time of the backoff operation in the primary link.

A link other than the primary link may be configured as the secondary link. Meanwhile, after the backoff operation ends in the primary link, an operation for identifying a channel occupancy state may be performed in the secondary link during a specific time period. When a channel state of the secondary link is a busy state during some time within the specific time period, the device may transmit a frame by using only the primary link. Alternatively, the device may perform a backoff operation in the secondary link. Alternatively, the device may perform backoff operations in a plurality of primary links for channel access. A plurality of primary links may be configured, and backoff operations may be performed in the plurality of primary links. In this case, when the channel state of the secondary link is an idle state for a time period (hereinafter, 'specific time period') before a specific time (e.g., a PIFS, DIFS, AIFS, or whole time of the backoff operation in the primary link) from a completion time of the backoff operation in the link where the backoff operation ends earlier, the device may perform transmission operations using the plurality of links.

When the multi-link operation is performed based on the synchronized transmission scheme, a receiving device (e.g., station, access point) may simultaneously receive a plurality of frames. Therefore, the frame reception operation may be simplified. The frame (e.g., data) transmitted in the synchronized transmission scheme may include information on links used for the synchronized transmissions. The information on the links (e.g., link IDs, etc.) used for the synchronized transmissions may be indicated in form of a bitmap by an extremely high throughput (EHT) signal (SIG) field including IEEE 802.11be signal information in a preamble of a physical-layer protocol data unit (PPDU). Alternatively, the information on the links (e.g., link IDs, etc.) used for the synchronized transmissions may be indicated by an EHT control field included in the frame.

Meanwhile, even when the STR operation is not possible in a plurality of links, a non-synchronized reception operation may be performed in the plurality of links. In this case, in order to increase channel efficiency in multi-links, the access point may configure start times of transmission operations to station(s) not to be the same, and may perform the corresponding transmission operations. In this case, a station in which the STR operation is not possible (e.g., non-STR STA) should transmit a response (e.g., acknowledgment (ACK)) to a frame received from the access point. Accordingly, end times of the transmission operations in the multi-links may be configured to be the same. The above-described operation may be referred to as a 'semi-synchronized multi-link operation'.

Figure 5B:
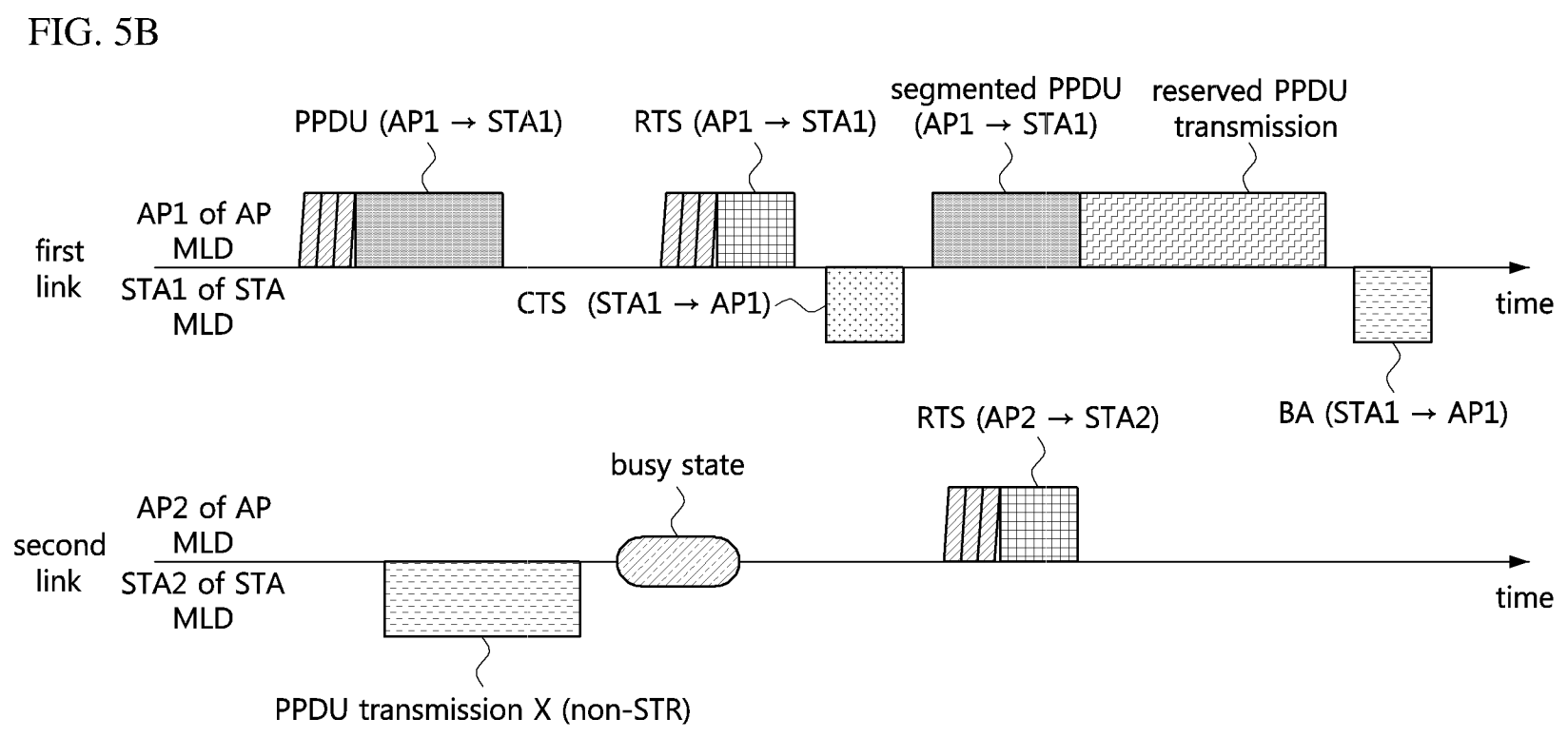

FIG. 5A is a timing diagram illustrating a first exemplary embodiment of a method of transmitting and receiving a data frame in a wireless LAN system supporting multi-links, and FIG. 5B is a timing diagram illustrating a second exemplary embodiment of a method of transmitting and receiving a data frame in a wireless LAN system supporting multi-links.

Referring to FIGS. 5A and 5B, the semi-synchronized multi-link operation may be performed in association with a request-to-send (RTS)-clear-to-send (CTS) operation. A station (e.g., STA MLD) may not support the STR operation. In this case, the following problems may occur. In exemplary embodiments, a station may refer to a 'STA MLD' or 'STA associated with a STA MLD', and an access point may refer to an 'AP MLD' or 'AP associated with an AP MLD'.

For example, the access point may acquire a transmit opportunity (TXOP) by performing an RTS-CTS operation in a first link. The RTS-CTS operation may include an RTS frame transmission/reception operation and a CTS frame transmission/reception operation. In a second link, a channel contention operation (e.g., channel access operation) may be completed. The access point may transmit an RTS frame in the second link. Since the station does not support the STR operation, it may not be able to transmit a CTS frame, which is a response to the RTS frame, in the second link. When the station transmits a CTS frame in the second link, the CTS frame may cause interference to the first link. Accordingly, a reception error for a data frame (e.g., PPDU) may occur in the first link. On the other hand, the access point may support the STR operation. Accordingly, the access point may perform a sensing operation and/or a reception operation in another link while performing a transmission operation in one link.

In order to solve the above-described problems, the station may perform a communication operation in one link, and then perform a communication operation in multiple links. For example, when the channel contention operation is completed in the second link while performing the transmission operation in the first link, the station may adjust a transmission end time of the frame in the first link according to a transmission end time of the RTS frame in the second link. In order to align the transmission end times in multiple links, the following operation(s) may be performed.

Operation 1: The access point may align the transmission end times in multiple links by shortening the length of the PPDU in the first link.

Operation 2: The access point may align the transmission end times in multiple links by adding padding to the PPDU according to Operation 1.

Operation 3: The access point may align the transmission end times in multiple links by adding padding to the RTS frame in the second link.

Alternatively, transmission end times may not be aligned in a short time in units of OFDM symbols within a specific period.

Figure 6A:
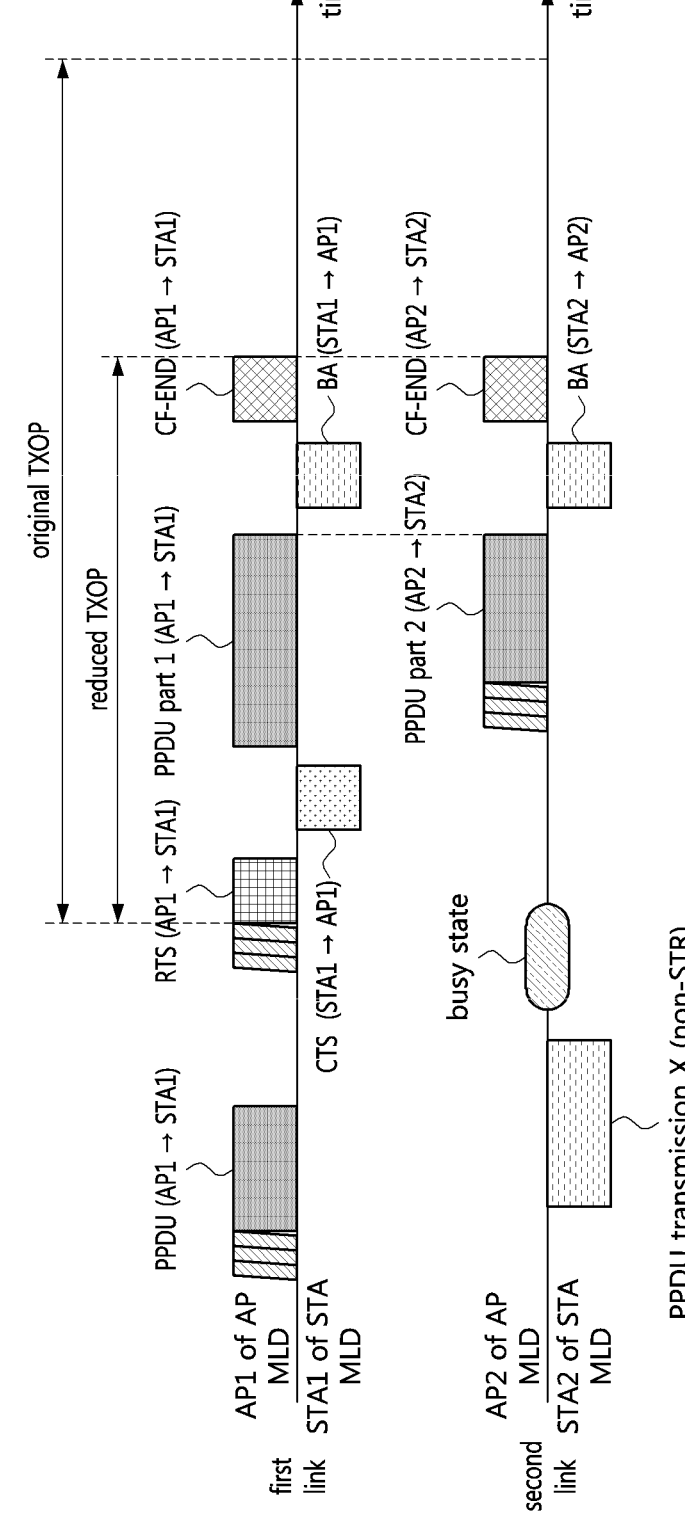
FIG. 6A is a timing diagram illustrating a third exemplary embodiment of a method of transmitting and receiving a data frame in a wireless LAN system supporting multi-links.
Figure 6B:
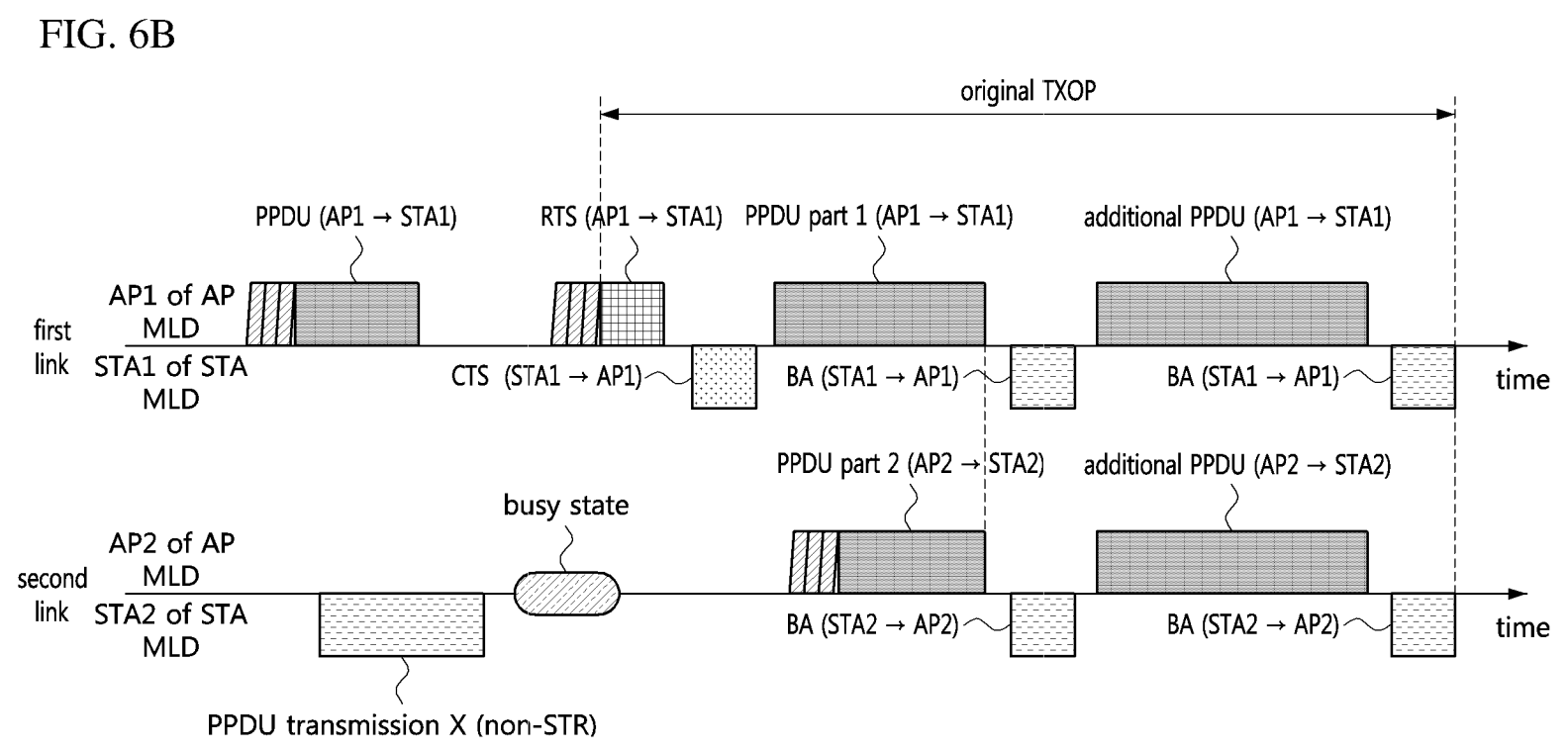
Figure 6C:
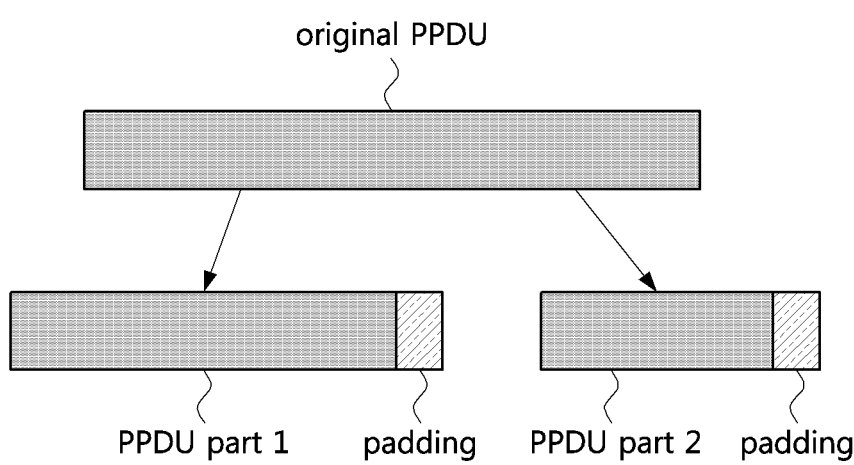
FIG. 6C is a conceptual diagram illustrating a first exemplary embodiment of a method of segmenting a PPDU in a wireless LAN system supporting multi-links.

FIG. 6A is a timing diagram illustrating a third exemplary embodiment of a method of transmitting and receiving a data frame in a wireless LAN system supporting multi-links, FIG. 6B is a timing diagram illustrating a fourth exemplary embodiment of a method of transmitting and receiving a data frame in a wireless LAN system supporting multi-links, and FIG. 6C is a conceptual diagram illustrating a first exemplary embodiment of a method of segmenting a PPDU in a wireless LAN system supporting multi-links.

Referring to FIGS. 6A to 6C, in order to support the semi-synchronized multi-link transmission, one PPDU may be segmented into a plurality of PPDU parts. For example, one PPDU may be divided into a PPDU part 1 and a PPDU part 2, the PPDU part 1 may be transmitted in a first link, and the PPDU part 2 may be transmitted in a second link. When the second link is available during PPDU transmission in the first link (e.g., when a channel access operation is successful in the second link), the access point may divide the PPDU into a plurality of PPDU parts, and the segmented PPDUs may be transmitted using the first link and the second link.

At the time at which the channel access operation succeeds in the second link during PPDU transmission in the first link, the remaining PPDU may be segmented into the plurality of PPDU parts. Padding (e.g., padding bit(s) and/or padding symbol(s)) may be applied to the PPDU part 1 and/or the PPDU part 2 so that transmission end times of the segmented PPDUs (e.g., PPDU part 1 and PPDU part 2) are the same. Here, the lengths of padding respectively added to the PPDU part 1 and the PPDU part 2 may be different.

When the segmented transmission of the PPDU (e.g., transmission of the PPDU part 1 and the PPDU part 2) is performed in multi-links, the transmission operation may not be performed in some period of a TXOP configured according to a duration indicated by the RTS frame transmitted in the first link. When a block ACK (BA) frame for the PPDU part 1 and the PPDU part 2 is received, the access point may terminate the TXOP by transmitting a contention free (CF)-END frame in each of the first link and the second link. Alternatively, a duration field included in the BA frame may indicate a length of the TXOP changed according to the segmented transmission of the PPDU. In this case, the duration field may indicate up to a time when the BA frame is transmitted, and the TXOP may be terminated early at an end of the BA frame.

If another packet to be transmitted to the station exists in the access point, the TXOP may not be terminated early. In this case, after receiving the BA frame for the segmented transmission of the PPDU, the access point may transmit an additional PPDU (e.g., another packet) within the TXOP. The additional PPDU may be transmitted after a SIFS from the reception time of the BA frame. The duration field included in the BA frame may indicate an end time of the original TXOP (e.g., the end time of the TXOP indicated by the RTS frame). In this case, the transmission operation of another packet may be performed by sharing the initial TXOP (e.g., original TXOP). When the transmission operation of the additional PPDU is completed within the TXOP, the corresponding TXOP may be terminated early. For example, when a BA frame for the additional PPDU is received, the access point may terminate the TXOP by transmitting a CF-END frame. Alternatively, a duration field included in the BA frame for the additional PPDU may indicate a transmission end time of the additional PPDU.

The TXOP sharing operation may be performed when some period within the initial TXOP remains. The remaining period within the initial TXOP may be used for a transmission operation of another station. The remaining period within the TXOP may refer to a TXOP sharing period. Another station may not perform a transmission operation due to a NAV setting, but may perform a reception operation. Accordingly, another station may receive a frame in the TXOP sharing period (e.g., the remaining period within the initial TXOP). Alternatively, another station may perform an uplink transmission operation in the TXOP sharing period. In this case, a trigger frame may be transmitted and received after a SIFS from the transmission time of the BA frame.

Instead of the trigger frame, a MU-RTS frame, which is a variant of the trigger frame, may be transmitted. Another station receiving the MU-RTS frame may omit transmission of a CTS frame, and may transmit a data frame after a SIFS. The trigger frame may be a frame for allocating a radio resource (e.g., time and/or frequency resource) to initiate transmission of another station, and may indicate transmission of one station. Alternatively, the station performing the uplink transmission operation may be a station transmitting the BA frame, and when the TXOP remains, the station may transmit the BA frame including data (e.g., packet) when transmitting the BA frame.

Figure 7A:
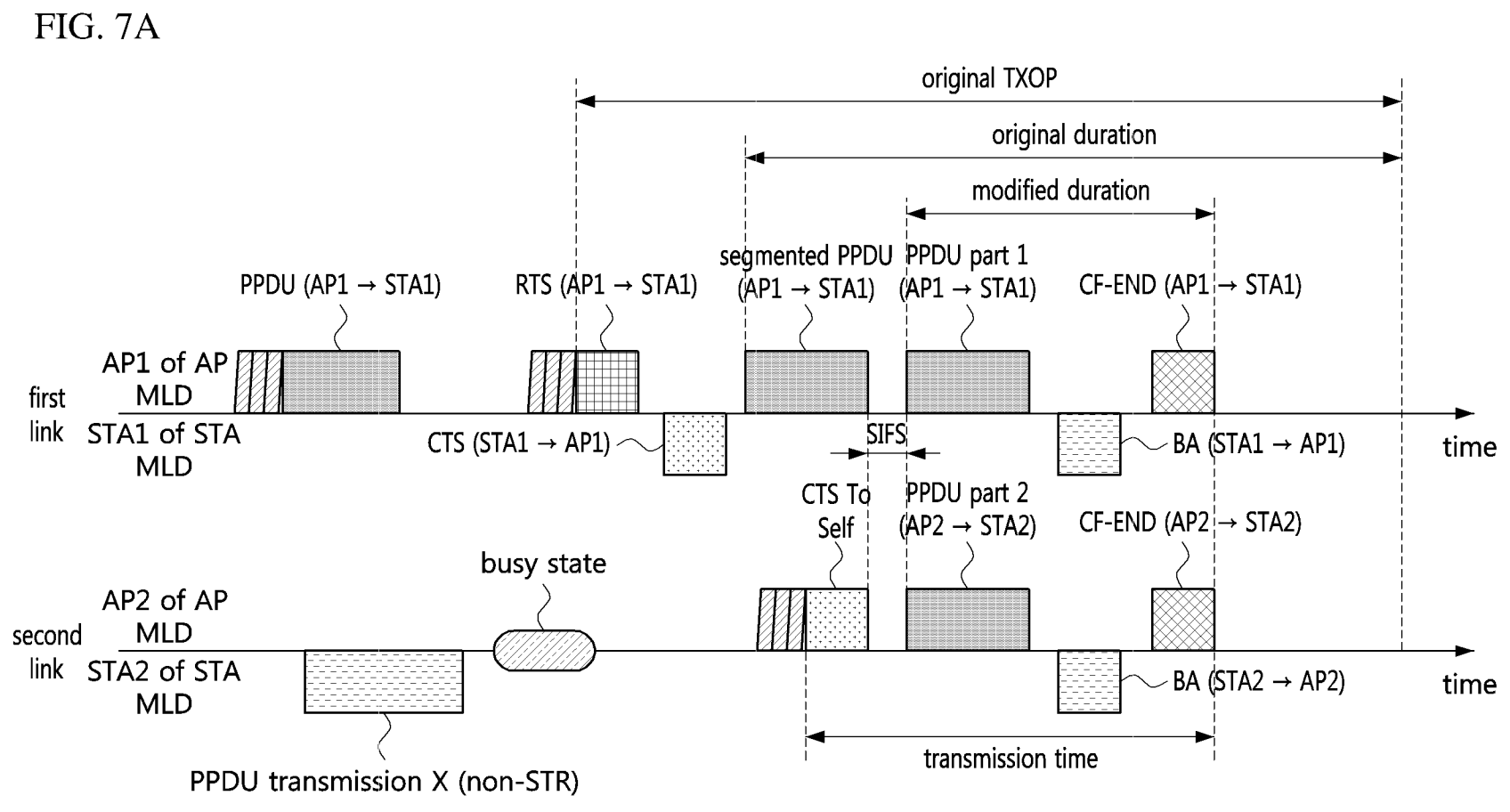
Figure 7B:
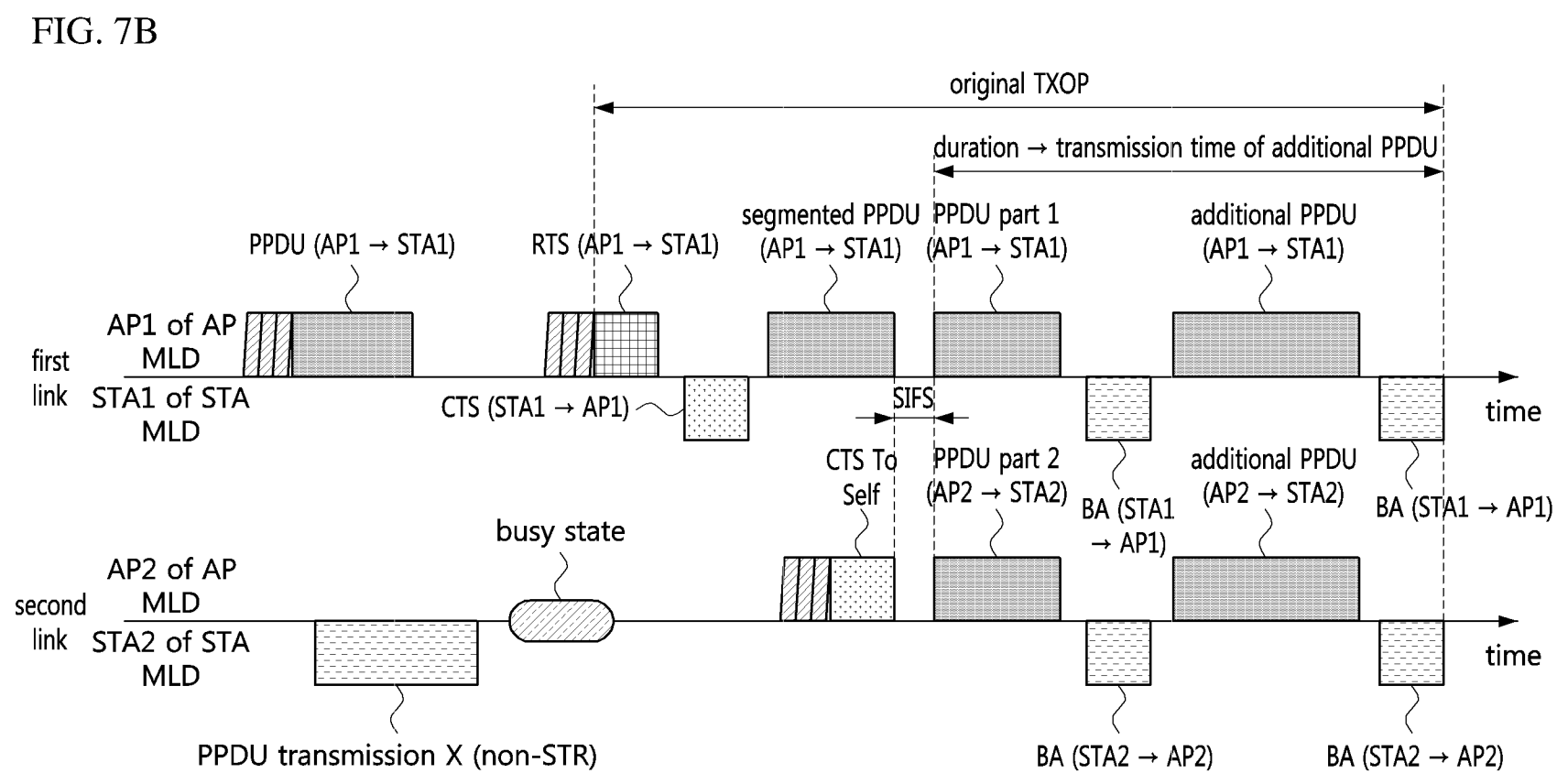
Figure 7C:
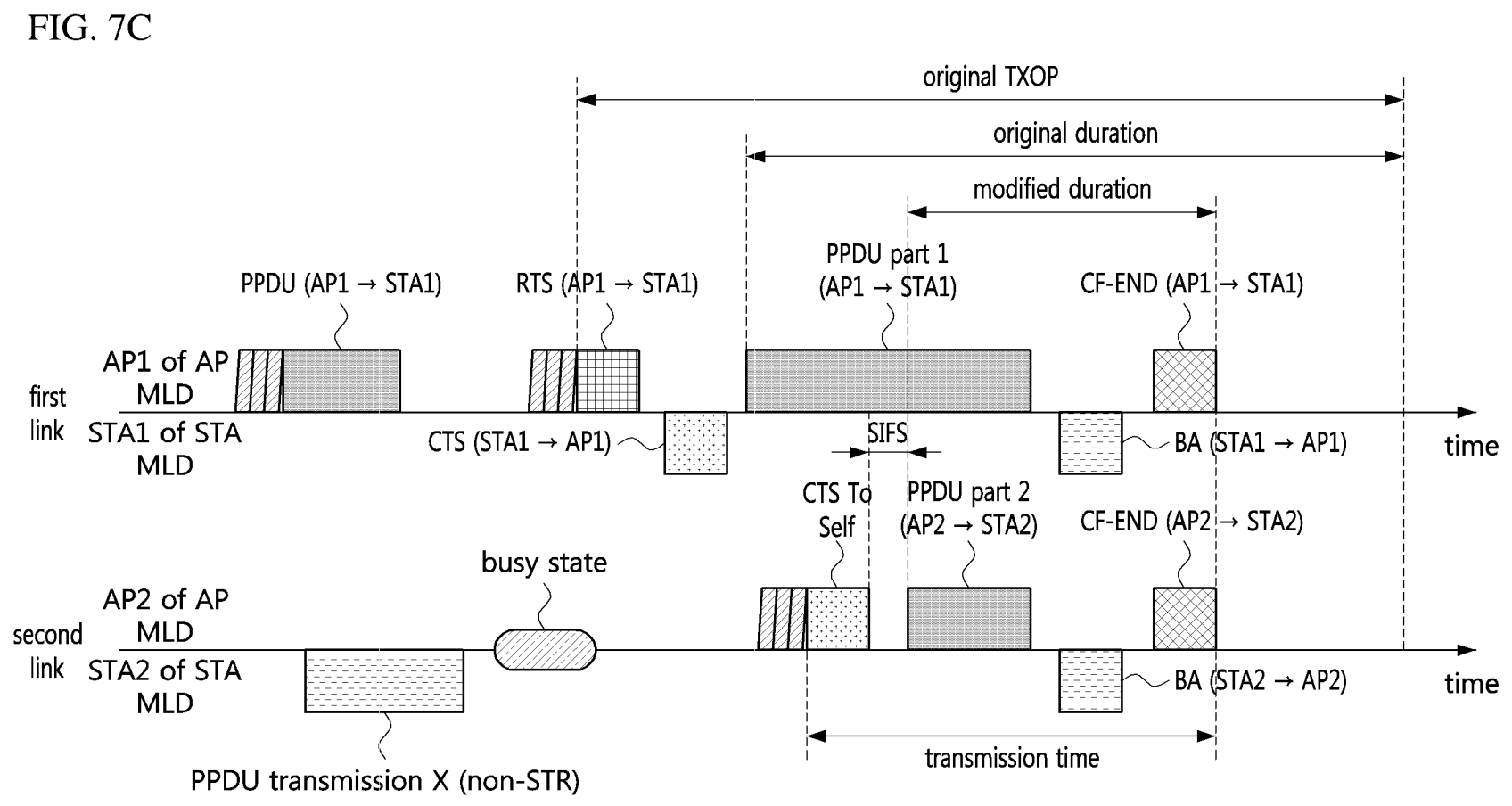

FIG. 7A is a timing diagram illustrating a fifth exemplary embodiment of a method of transmitting and receiving a data frame in a wireless LAN system supporting multi-links, FIG. 7B is a timing diagram illustrating a sixth exemplary embodiment of a method of transmitting and receiving a data frame in a wireless LAN system supporting multi-links, and FIG. 7C is a timing diagram illustrating a seventh exemplary embodiment of a method of transmitting and receiving a data frame in a wireless LAN system supporting multi-links.

Referring to FIGS. 7A to 7C, in order to perform the semi-synchronized multi-link operation, one PPDU may be segmented into a plurality of PPDU parts, and the plurality of PPDU parts may be transmitted in multiple links. When a second link is available during PPDU transmission in a first link (e.g., when a channel access operation is successful in the second link), the access point may segment the PPDU into a plurality of PPDU parts, and transmit the PPDU parts by using the first link and the second link.

When the channel access operation is successful in the second link, the access point may transmit a CTS-to-Self frame in the second link. The CTS-to-Self frame may be a control frame including a receiver address. The receiver address of the CTS-to-Self frame may be set to indicate itself (e.g., the access point). The station may receive the CTS-to-Self frame from the access point, may set a NAV based on the CTS-to-Self frame, and may not perform a transmission operation in a period for which the NAV is set.

The CTS-to-Self frame may be a control frame transmitted before performing the transmissions of the PPDU part. In this case, the receiver address of the CTS-to-Self frame transmitted from the access point may be set to indicate the station. A duration field included in the CTS-to-Self frame may indicate an end time of the TXOP (e.g., initial TXOP, original TXOP). The station may receive the CTS-to-Self frame from the access point, and may determine that the transmission of the PPDU part is performed after a SIFS from a time when the CTS-to-Self frame is received.

The station may perform a buffer management preparation operation for concatenating the PPDU parts received in the first link and the second link during a SIFS. The PPDU transmitted in the first link may be segmented according to the transmission end time of the CTS-to-Self frame. The remaining PPDU may be segmented into a PPDU part 1 and a PPDU part 2. The access point may transmit the PPDU part 1 after a SIFS from the end time of the PPDU in the first link, and may transmit the PPDU part 2 after a SIFS from the end time of the CTS-to-Self frame in the second link.

The length of the TXOP may be adjusted based on a value indicated by the duration field included in the CTS-to-Self frame. The time for which one PPDU is transmitted in the first link may be longer than the time for which the segmented PPDUs are transmitted in the first link and the second link. The original TXOP configured by the RTS frame may be adjusted based on the value indicated in the duration field of the CTS-to-Self frame, and a duration field included in a MAC header of the segmented PPDU (e.g., PPDU part 1) in the first link also may have the same adjusted value. The length of the TXOP may be adjusted based on the duration for the PPDU part 1 and the PPDU part 2. In the exemplary embodiment shown in FIG. 7A, the transmission of the PPDU parts may be terminated early. As another example of the TXOP adjustment method for early transmission termination, the duration field of the CTS-to-Self frame and the duration field included in the MAC header of the segmented PPDU may indicate the end time of the original TXOP, and the duration field included in the MAC header of the BA frame may indicate the adjusted TXOP time (e.g., reduced TXOP, modified TXOP). Based on the above-described configuration, the TXOP adjustment operation may be performed. Alternatively, when the transmission of the segmented PPDUs (e.g., PPDU part 1, PPDU part 2) is completed, the TXOP may be adjusted by transmitting a CF-END frame, and accordingly, the TXOP may be terminated early.

In the exemplary embodiment shown in FIG. 7B, the remaining period within the TXOP (e.g., TXOP sharing period) may be used for transmission of another PPDU. That is, the TXOP may be shared. In this case, the length of the TXOP may be set in consideration of a transmission time of another PPDU. The end time of the TXOP may be indicated by a duration field included in a MAC header of a BA frame, and the TXOP may be terminated early based on a value indicated by the BA frame. Alternatively, the TXOP may be terminated by transmitting a CF-END frame. The PPDU may be segmented into three PPDU parts, and a PPDU part having the shortest length among the three PPDU parts may be transmitted instead of the CTS-to-Self frame. In this case, the PPDU part having the shortest length may perform the function of the CTS-to-Self frame.

Even when the CTS-to-Self frame is transmitted, the existing transmission may continue. In the exemplary embodiment shown in FIG. 7C, the access point may succeed in the channel access operation in the second link while performing the transmission operation in the first link. In this case, the access point may segment the PPDU into a PPDU part 1 and a PPDU part 2, transmit the PPDU part 1 in the first link, and transmit the PPDU part 2 in the second link. In the second link, the PPDU part 2 may be transmitted after the end time of the CTS-to-Self frame. The CTS-to-Self frame may include information indicating a transmission time in the second link. When BA frames for the PPDU parts are received, the access point may terminate the TXOP acquired in the first link by transmitting a CF-END frame. Since the PPDU parts are transmitted after channel access operations are performed, padding may be added to a PPDU terminated earlier in one link until a transmission end time of a PPDU in another link in order to match the transmission end times of the PPDU parts in the respective links. Alternatively, after the transmission of the PPDU terminated early in one link, a dummy signal may be transmitted until a transmission end time of a PPDU part in another link. According to the above-described operation, transmissions in both links may be terminated at the same time. By extending an OFDM signal, the same effect as the transmission of the dummy signal may be generated.

The TXOP sharing operation may be performed when some period within the initial TXOP (e.g., original TXOP) remains. The remaining period within the initial TXOP may be used for a transmission operation (e.g., downlink transmission operation) of another station. Another station may not perform a transmission operation due to a NAV setting, but may perform a reception operation. Accordingly, another station may receive a frame in the TXOP sharing period (e.g., the remaining period within the initial TXOP). Alternatively, another station may perform an uplink transmission operation in the TXOP sharing period. In this case, a trigger frame indicating a certain terminal to perform transmission by using a certain radio resource may be transmitted/received after a SIFS from a transmission time of the BA frame. Alternatively, the BA frame may include the trigger frame. The trigger frame may be a basic trigger frame. Alternatively, a trigger frame such as an MU-RTS frame may be transmitted. The trigger frame may be a control frame for indicating a time at which a single station or a plurality of stations can perform transmission and resource(s) therefor. The trigger frame may serve to indicate a transmission time when a single station is indicated. The MU-RTS frame may be used to indicate a transmission time of direct communication between terminals. In this case, a station (e.g., station indicated by the MU-RTS frame) that receives the MU-RTS frame and participates in direct communication between terminals may omit CTS transmission, and transmit a data frame after a SIFS from a reception time of the MU-RTS frame. In this case, a receiver address of the data frame may not indicate the access point, but may indicate another station.

Figure 8:
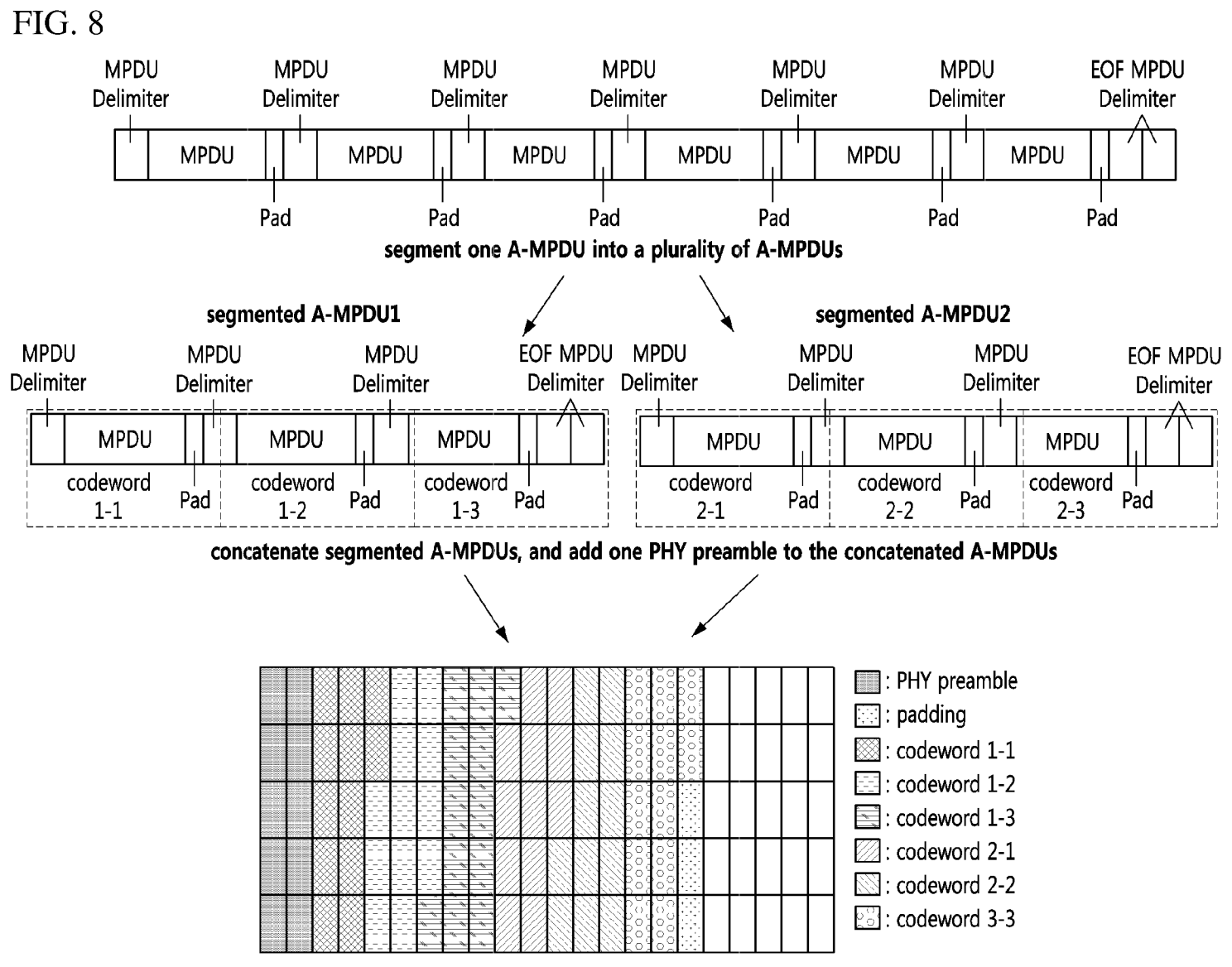

FIG. 8 is a conceptual diagram illustrating a second exemplary embodiment of a method for segmenting a PPDU in a WLAN system supporting multi-links.

Referring to FIG. 8, an aggregate-MAC protocol data unit (A-MPDU) may include a plurality of MPDUs. Therefore, the length of the A-MPDU may be long. When the MPDU is segmented in an A-MPDU segmentation procedure, the original MPDU may not be restored. When a segmentation unit is large, a lot of padding may be required. When a segmentation unit is n codewords, the A-MPDU may be efficiently segmented. n may be a positive integer. For example, each of the segmented A-MPDUs may include three codewords, and padding may be added to the segmented A-MPDU. A channel coding operation (e.g., low density parity check (LDPC) operation) for the segmented A-MPDU may be performed. The segmented A-MPDUs may be concatenated, and one PHY preamble may be added to the concatenated A-MPDUs. Modulation symbols of the concatenated A-MPDUs may be mapped to resources, and null signals may be mapped to the remaining resources. Alternatively, modulation symbols corresponding to 1 may be mapped to the remaining resources.

Figure 9A:
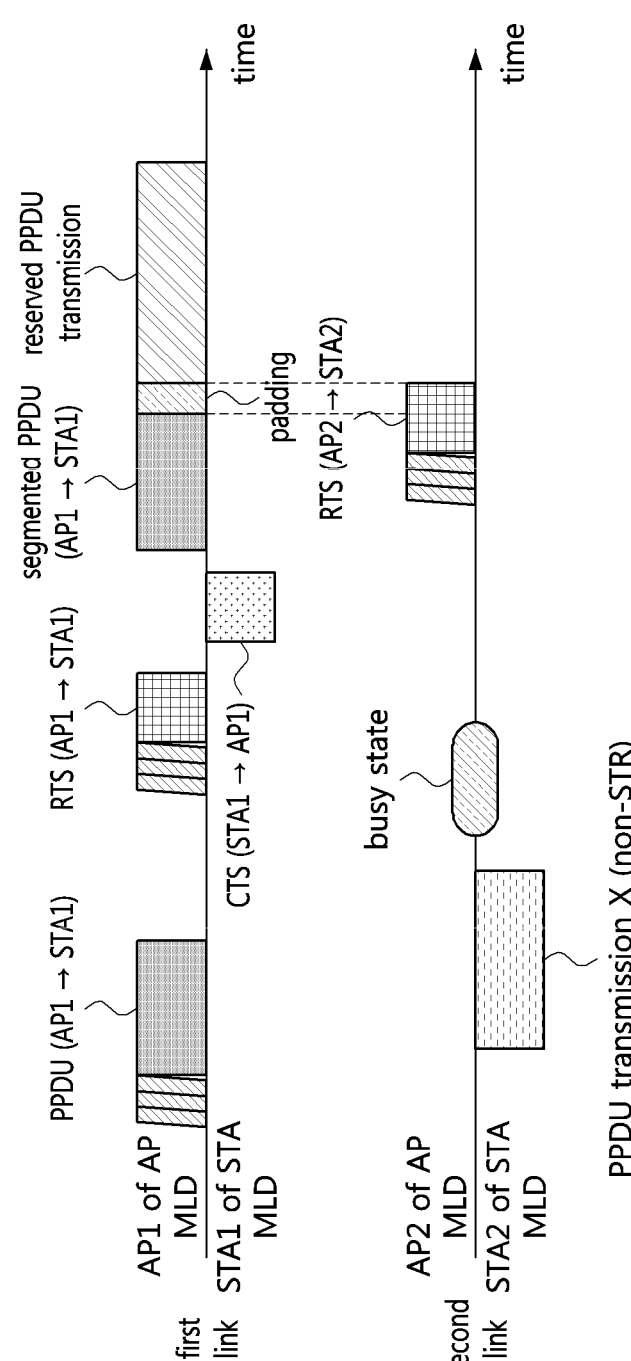
FIG. 9A is a timing diagram illustrating an eighth exemplary embodiment of a method of transmitting and receiving a data frame in a wireless LAN system supporting multi-links.
Figure 9B:
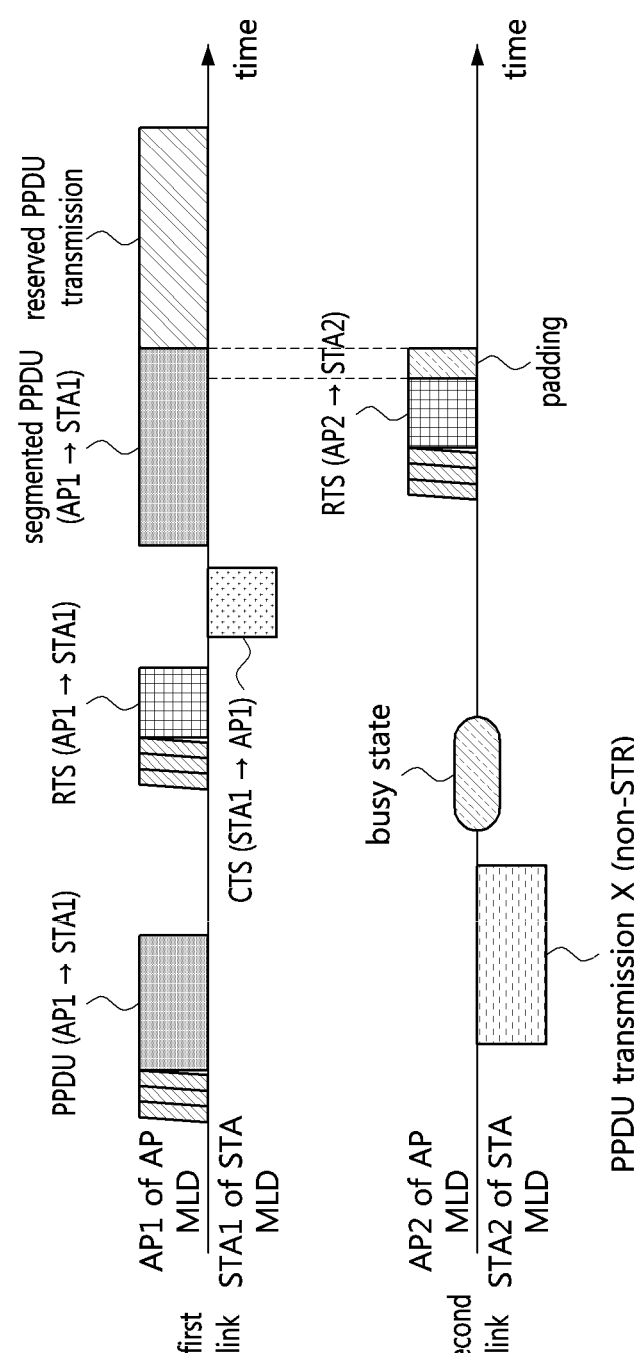
FIG. 9B is a timing diagram illustrating a ninth exemplary embodiment of a method of transmitting and receiving a data frame in a wireless LAN system supporting multi-links.

FIG. 9A is a timing diagram illustrating an eighth exemplary embodiment of a method of transmitting and receiving a data frame in a wireless LAN system supporting multi-links, and FIG. 9B is a timing diagram illustrating a ninth exemplary embodiment of a method of transmitting and receiving a data frame in a wireless LAN system supporting multi-links.

Referring to FIGS. 9A and 9B, when a channel state of a first link is an idle state and a channel state of a second link is a busy state, the access point may transmit an RTS frame in the first link, and receive a CTS frame, which is a response to the RTS frame, from the station in the first link. Thereafter, the access point may transmit a PPDU in the first link. During transmission of the PPDU in the first link, a channel access operation may be successful in the second link. That is, the channel state of the second link may be an idle state. In this case, in order to perform communication in the second link, the access point may transmit an RTS frame, CTS-to-Self frame, or segmented PPDU. Here, each of the RTS frame, CTS-to-Self frame, and segmented PPDU may be referred to as a reserved frame.

In order to align transmission end times in multiple links, the access point may add padding to the segmented PPDUs. In this case, the end time of the segmented PPDU in the first link may be aligned with the end time of the reserved frame (e.g., RTS frame, CTS-to-Self frame, or segmented PPDU) in the second link. In order to align the transmission end times in multiple links, the following two methods may be used. When Method 1 is used, padding may be added to the segmented PPDU of the first link in order to align it with the end time of the reserved frame transmitted in the second link. When Method 2 is used, padding may be added to the reserved frame of the second link in order to align it with the end time of the segmented PPDU transmitted in the first link.

In Method 1, the access point may segment the PPDU in consideration of the end time of the reserved frame. The PPDU may be segmented before the end time of the reserved frame. The PPDU (e.g., A-MPDU) may be segmented into decodable units. The A-MPDU may be segmented into units of n codewords. When the A-MPDU is not segmented into units of n codewords, the corresponding A-MPDU may be segmented on an MPDU basis. In order to match the end time of the segmented A-MPDU to the end time of the reserved frame, padding may be added to the segmented A-MPDU. The padding may be a specific value or a specific modulation symbol. Even when an end symbol of the segmented A-MPDU is the same as an end symbol of the reserved frame, data may not be mapped to some subcarriers in the end symbol of the segmented A-MPDU. In this case, padding may be added to some subcarriers in the end symbol of the segmented A-MPDU.

In Method 2, when the end time of the segmented A-MPDU (e.g., segmented MPDU) is after the end time of the reserved frame, padding may be added to the reserved frame to match the end times. The padding may be added to the reserved frame in the MAC layer. Here, the padding may be padding bit(s) or padding symbol(s) indicating 1.

The remaining PPDU (e.g., reserved PPDU) after matching the transmission end times may be transmitted as being segmented into the first link and the second link. The transmission end time of the remaining PPDU may be set equally by adding padding. Alternatively, the remaining PPDU may be transmitted after a SIFS.

Figure 10A:
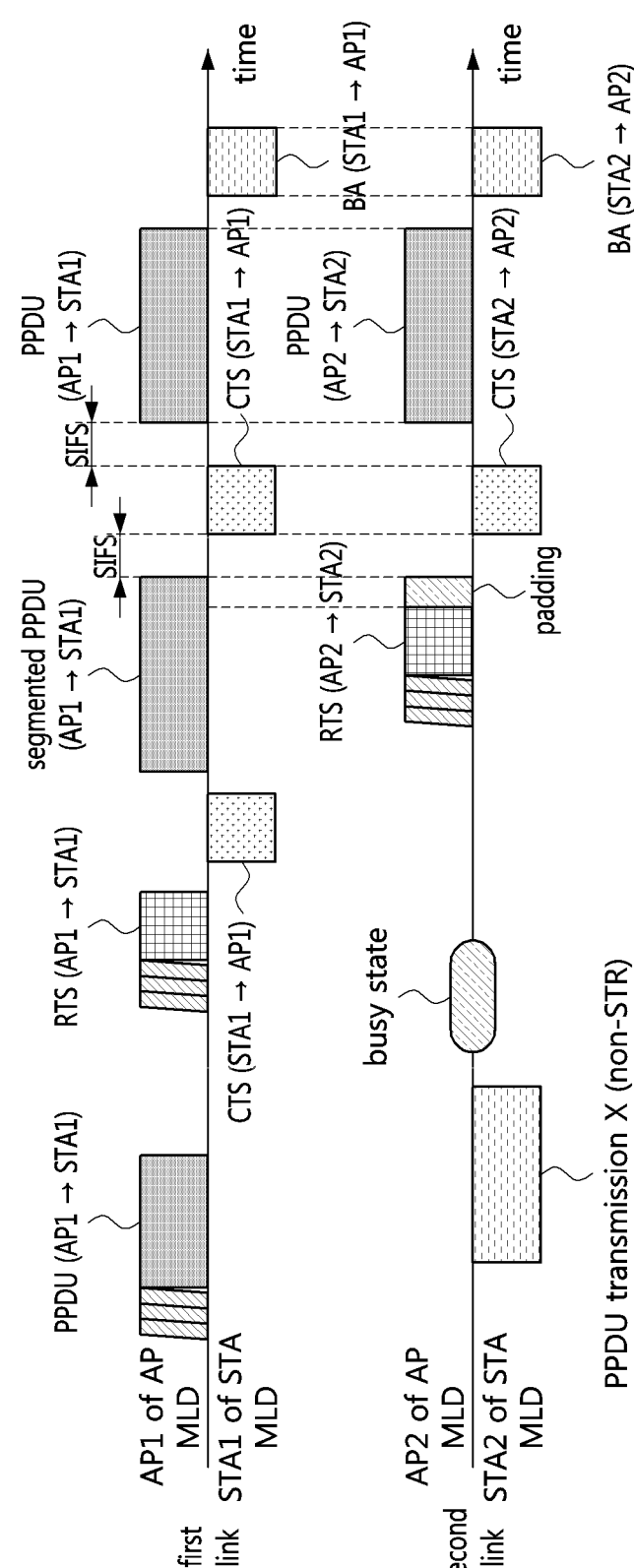
FIG. 10A is a timing diagram illustrating a tenth exemplary embodiment of a method of transmitting and receiving a data frame in a wireless LAN system supporting multi-links.
Figure 10B:
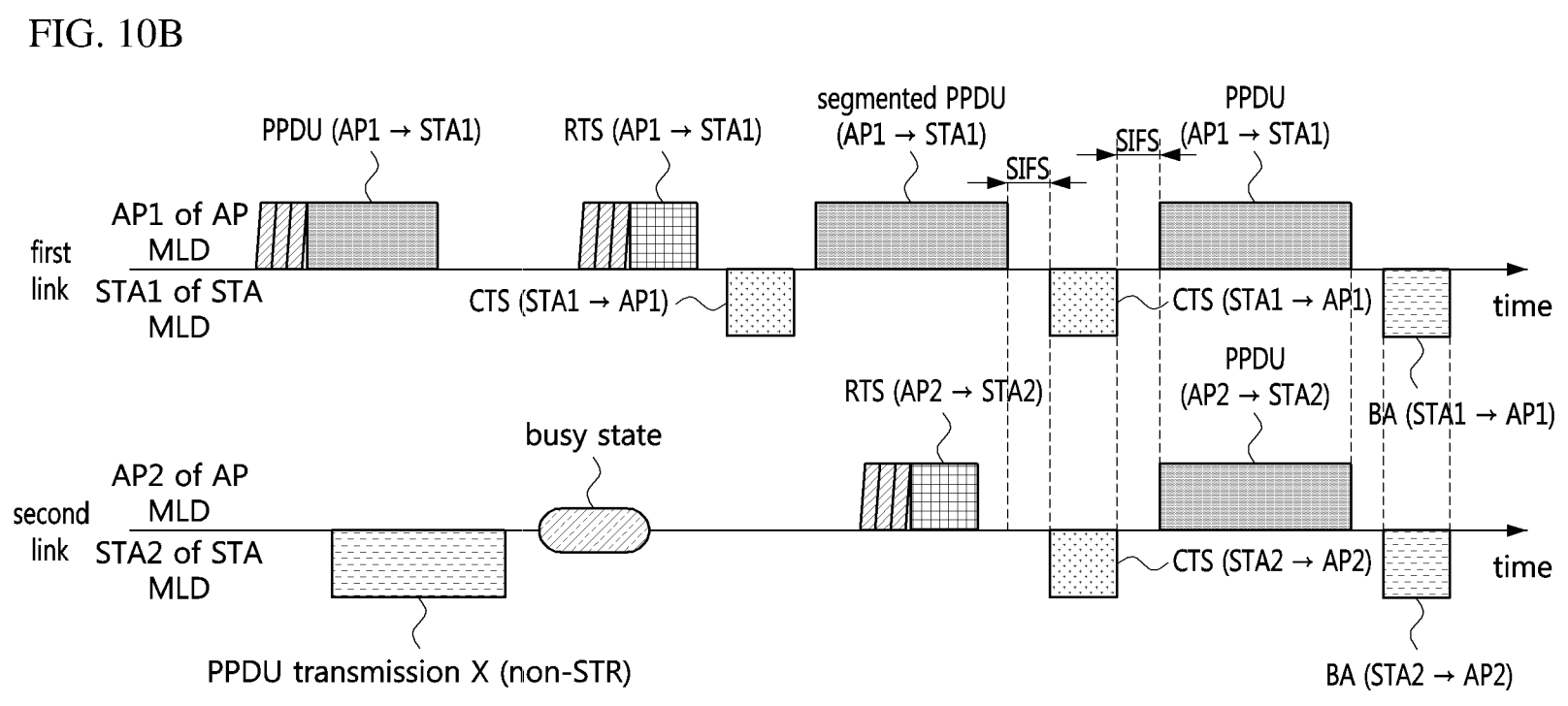

FIG. 10A is a timing diagram illustrating a tenth exemplary embodiment of a method of transmitting and receiving a data frame in a wireless LAN system supporting multi-links, and FIG. 10B is a timing diagram illustrating an eleventh exemplary embodiment of a method of transmitting and receiving a data frame in a wireless LAN system supporting multi-links.

Referring to FIGS. 10A and 10B, when a channel state of a first link is an idle state and a channel state of a second link is a busy state, the access point may transmit an RTS frame in the first link, and receive a CTS frame, which is a response to the RTS frame, from the station in the first link. Thereafter, the access point may transmit a PPDU (e.g., segmented PPDU) in the first link. During transmission of the PPDU in the first link, a channel access operation may be successful in the second link. That is, the channel state of the second link may be an idle state. In this case, in order to perform communication in the second link, the access point may transmit an RTS frame in the second link.

In the exemplary embodiment shown in FIG. 10A, in order to match the end time of the RTS frame in the second link and the end time of the segmented PPDU in the first link, the access point may add padding to the RTS frame.

The station may receive the RTS frame from the access point in the second link, and transmit the CTS frame after a SIFS from the end time of the RTS frame (e.g., RTS frame+ padding). The CTS frames may be transmitted at the same time in the first link and the second link. The access point may receive the CTS frames from the station in the first link and the second link, and transmit PPDUs (e.g., segmented PPDUs) to the station in the first link and the second link. The transmission times of the PPDUs in the first link and the second link may be the same.

In the exemplary embodiment shown in FIG. 10B, the end time of the segmented PPDU in the first link may not be the same as the end time of the RTS frame in the second link. That is, the access point may not perform an operation of matching the end time of the segmented PPDU in the first link and the end time of the RTS frame in the second link. The station may receive the segmented PPDU from the access point in the first link, and may transmit the CTS frame (e.g., response to the RTS frame received in the second link) after a SIFS from the end time of the segmented PPDU. The CTS frames may be transmitted at the same time in the first link and the second link. In this case, the station may transmit the CTS frame in the second link after (end time of the RTS frame+SIFS+T1). T1 may be a difference between the end time of the segmented PPDU in the first link and the end time of the RTS frame in the second link. For example, T1 may be a time corresponding to the padding added to the segmented PPDU in the first link. Alternatively, when the transmission of the RTS frame in the second link ends later than the transmission of the PPDU frame in the first link, the CTS frame may be transmitted after (PPDU end time+SIFS+ T2). T2 may be a difference between the end time of the segmented PPDU in the first link and the end time of the RTS frame in the second link. For example, T2 may be a time corresponding to the padding added to the RTS frame in the second link. T1 or T2 may be set so that 'SIFS+ (T1 or T2)<DIFS', 'SIFS+ (T1 or T2)<AIFS (e.g., minimum AIFS)', or 'SIFS+ (T1 or T2)<PIFS' is satisfied. Each of T1 and T2 may be a time within 1 OFDM symbol time or a time within 4 us. The access point may receive the CTS frames from the station in the first link and the second link, and transmit PPDUs (e.g., segmented PPDUs) to the station in the first link and the second link. The transmission times of the PPDUs in the first link and the second link may be the same.

On the other hand, the station may transmit a CTS frame without receiving an RTS frame. A transmission operation of the CTS frame without reception of the RTS frame may be performed based on Scheme 1 or Scheme 2 below. In Scheme 1, the access point may generate an RTS frame including a link ID(s) indicating a link(s) for transmitting a CTS frame(s), and may transmit the RTS frame in the second link. The link ID(s) included in the RTS frame may indicate the first link or both the first link and the second link. The station may receive the RTS frame from the access point in the second link, and may identify link(s) in which the CTS frame(s) are to be transmitted based on the link ID(s) included in the RTS frame. The station may simultaneously transmit the CTS frame(s) in the first link and the second link (e.g., link(s) indicated by the RTS frame) after a SIFS from the end time of the RTS frame (e.g., RTS frame+padding). Here, the RTS frame may be an MU-RTS frame. Alternatively, the RTS frame may additionally include a link ID(s). In Scheme 2, the station may receive an RTS frame in the second link from an access point included in the same AP MLD including the access point of the first link while receiving a frame (e.g., PPDU) from the access point in the first link. In this case, if the channel state of the second link is an idle state, the station may simultaneously transmit the CTS frames in the first link and the second link after a SIFS from the time when the PPDU is received in the first link.

Figure 11A:
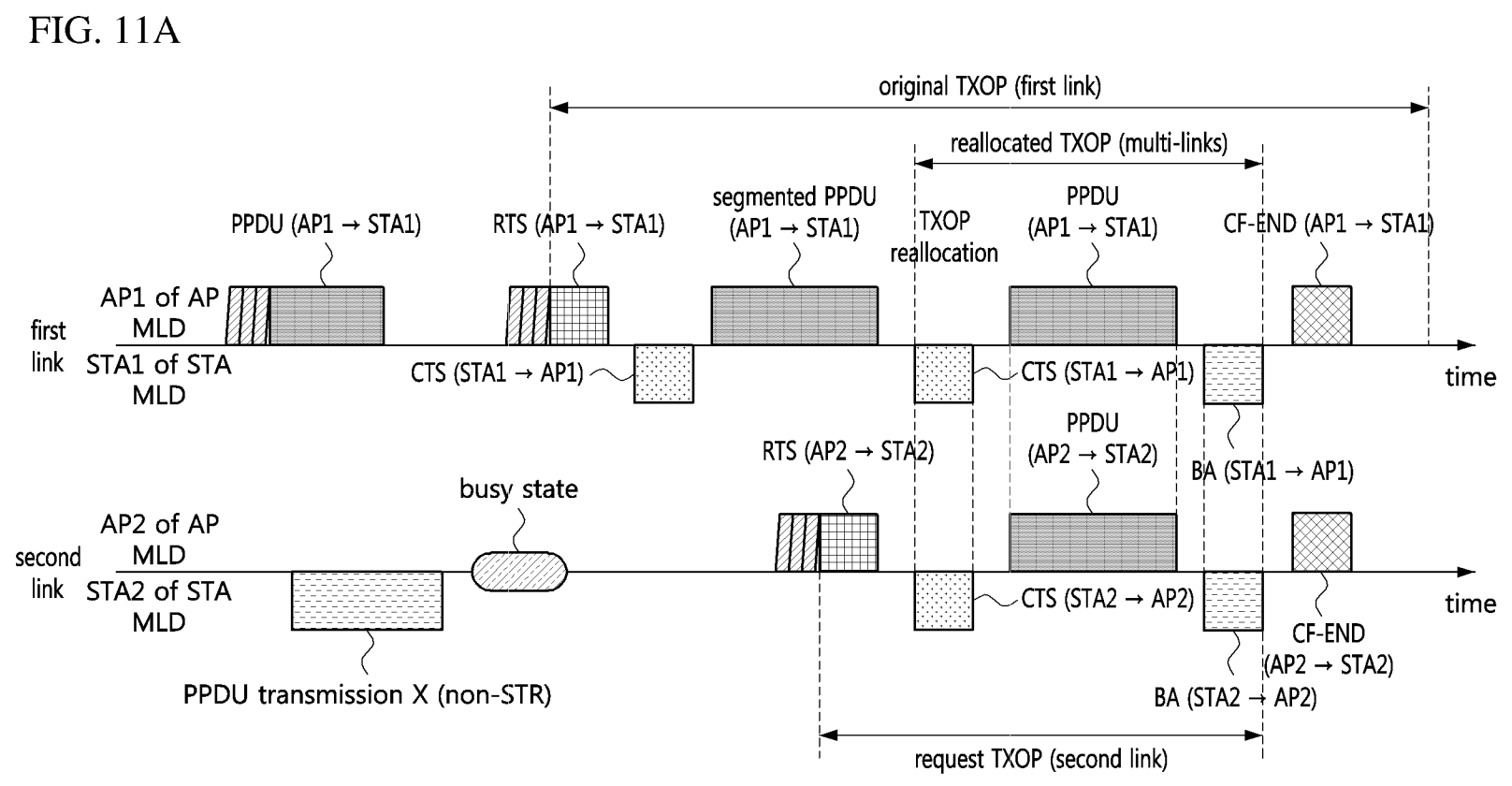
Figure 11B:
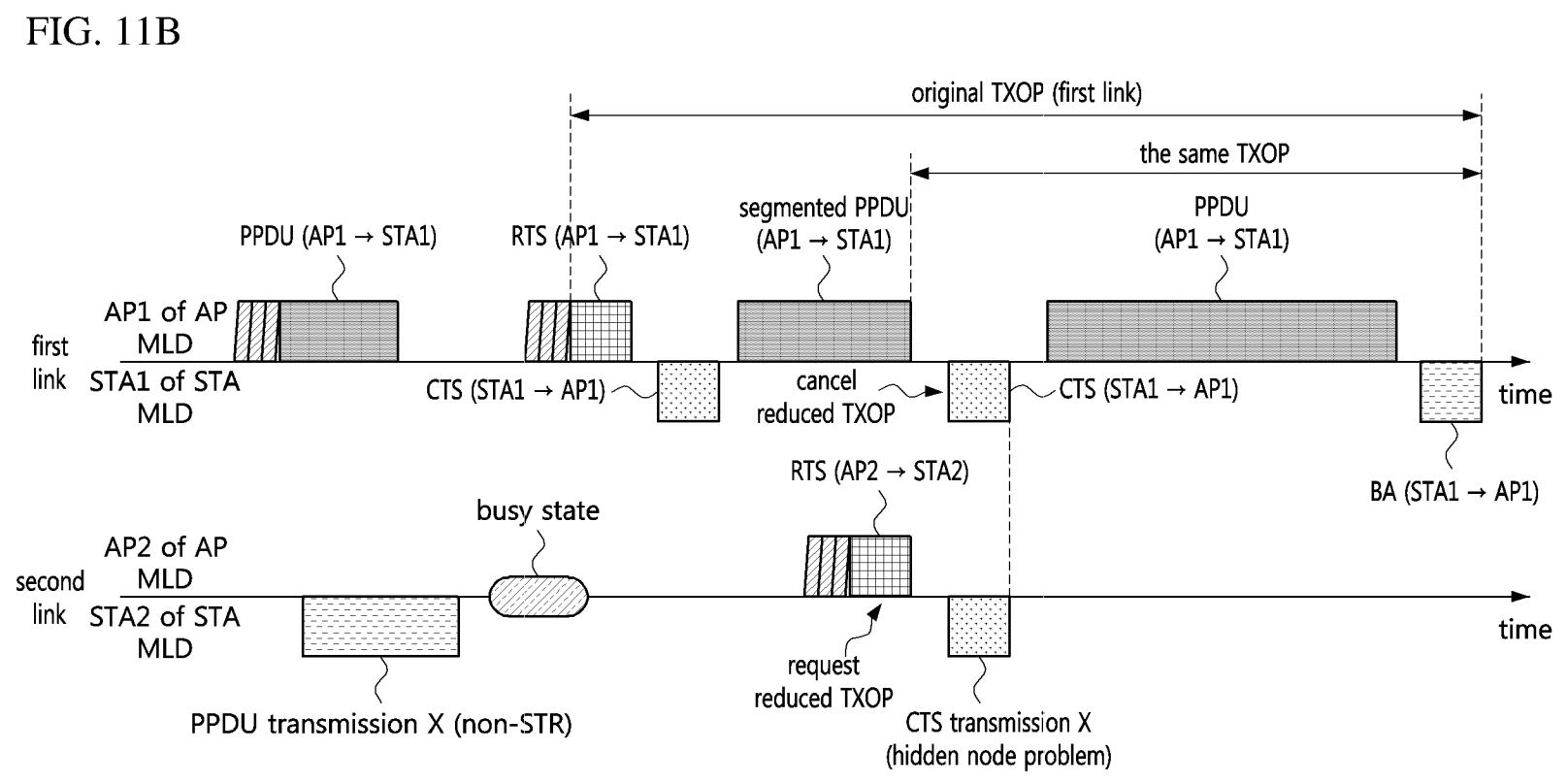

FIG. 11A is a timing diagram illustrating a twelfth exemplary embodiment of a method of transmitting and receiving a data frame in a wireless LAN system supporting multi-links, and FIG. 11B is a timing diagram illustrating a thirteenth exemplary embodiment of a method of transmitting and receiving a data frame in a wireless LAN system supporting multi-links.

Referring to FIGS. 11A and 11B, a TXOP may be real-located for transmission of an additional PPDU. The access point may transmit an RTS frame in the second link while transmitting a PPDU in the first link. The RTS frame may be transmitted when a channel contention operation (e.g., channel access operation) is completed in the second link.

The end time of the PPDU in the first link and the end time of the RTS frame in the second link may be configured to be the same. The station may receive the PPDU from the access point in the first link and receive the RTS frame from the access point in the second link. When the channel states of the first link and the second link are idle states, the station may transmit CTS frames to the access point in response to the RTS frame. The CTS frames may be transmitted in the first link and the second link. In addition, the CTS frames may be transmitted simultaneously in multiple links.

The end time of the TXOP in the multi-links may be the same as the end time of the TXOP in the first link. The end time of the TXOP in the multi-links may be reconfigured. For example, the end time of TXOP in the multi-links may be earlier than the end time of TXOP in the first link. A TXOP re-acquisition operation may be performed in the multi-links. In this case, the access point may transmit the remaining data by performing a multi-link operation. In multiple links (e.g., the first link and the second link), the transmission end times may be configured to be the same. When the multi-link operation is terminated, the access point may receive the remaining data in the multi-links, and may transmit ACK frames for the remaining data by performing a multi-link operation.

Meanwhile, when the end time of the TXOP in the multi-links is configured to be the same as the end time of the TXOP in the first link, the transmission/reception operation of the frame using the multi-links may be completed before the end time of the TXOP in the first link. In this case, the access point may return the remaining TXOP by transmitting a CF-END frame. That is, the TXOP may be terminated early.

In the exemplary embodiment shown in FIG. 11B, since the transmission operation is performed using multi-links, a remaining period may occur in the TXOP. The remaining period may be a period in which a frame transmission/ reception operation is not performed. In this case, the access point may transmit an RTS frame including information indicating the reduced TXOP in the second link. The station may receive the RTS frame from the access point, and may identify that the TXOP is reduced based on the information included in the RTS frame. When the channel state is an idle state, the station may transmit CTS frames to the access point in response to the RTS frame. The CTS frames may be transmitted in the first link and the second link.

However, when the channel state of the second link is busy, the station may transmit the CTS frame in the first link. That is, the CTS frame may not be transmitted in the second link. Here, the channel state of the second link may be determined as a busy state due to a hidden node.

When the CTS frame is transmitted only in the first link, multi-link transmission (e.g., reduced TXOP) may be canceled. Accordingly, the access point may transmit the remaining PPDU to the station using only the first link without using the second link. The PPDU transmission/reception operation may not be completed within the TXOP. For example, for the PPDU transmission/reception operation, 'remaining period within the TXOP+transmission/reception period of the CTS frame+two SIFS(s)' may be required. That is, 'transmission/reception period of the CTS frame+two SIFS(s)' may be further required. The PPDU part 1 of the remaining PPDU may be transmitted within the TXOP, and the remaining PPDU part 2 of the remaining PPDU may be transmitted by performing a channel contention operation. Alternatively, the TXOP may be extended in consideration of the transmission time of the remaining PPDU.

Figure 12:
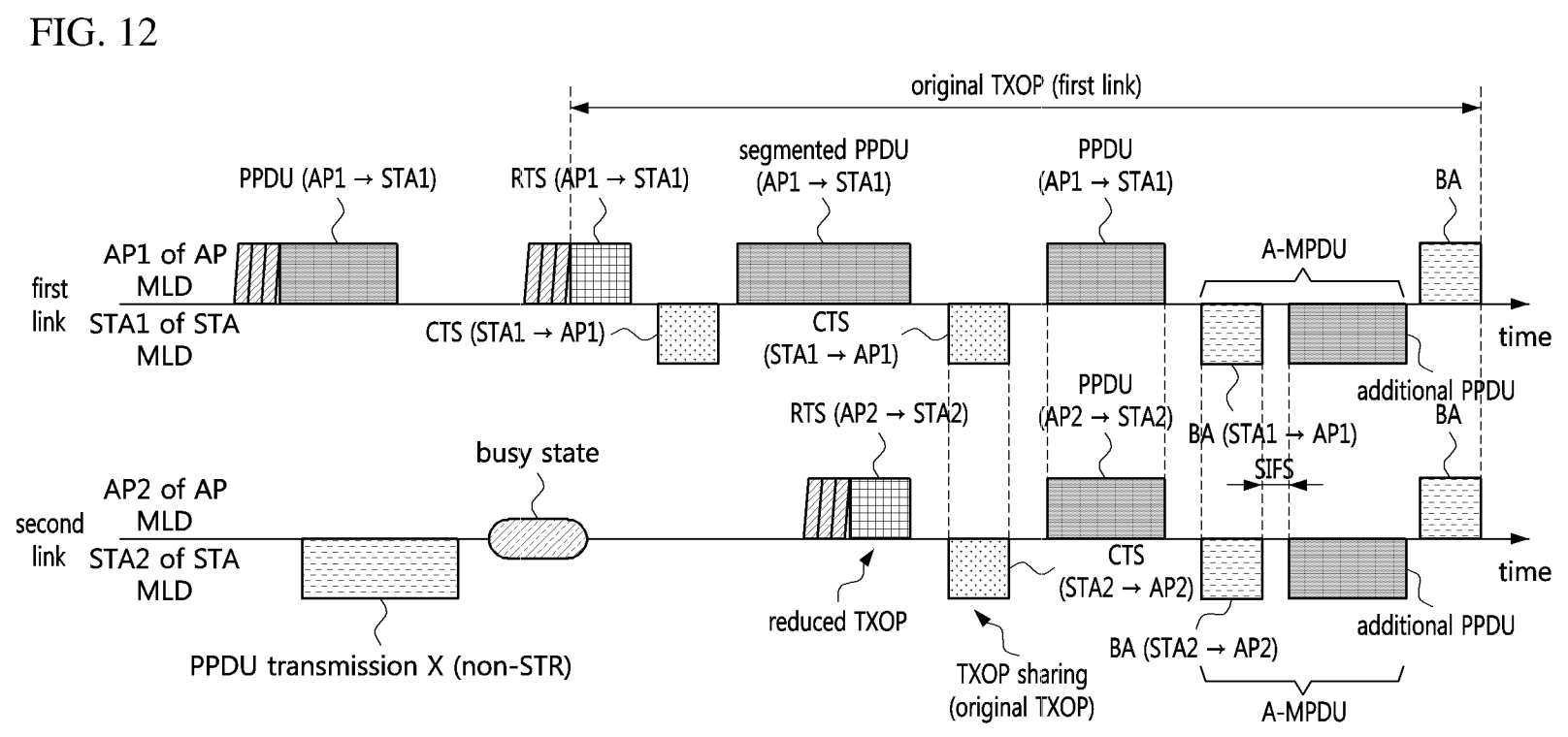

FIG. 12 is a timing diagram illustrating a fourteenth exemplary embodiment of a method for transmitting and receiving a data frame in a wireless LAN system supporting multi-links.

Referring to FIG. 12, additional data (e.g., additional PPDU) may be transmitted by sharing the remaining TXOP. The access point may transmit an RTS frame in the second link while transmitting a PPDU in the first link. The RTS frame may be transmitted when a channel contention operation (e.g., channel access operation) is completed in the second link. The end time of the PPDU in the first link and the end time of the RTS frame in the second link may be configured to be the same. The station may receive the PPDU from the access point in the first link and the RTS frame from the access point in the second link. When the channel states of the first link and the second link are idle states, the station may transmit CTS frames to the access point in response to the RTS frame. The CTS frames may be transmitted in the first link and the second link. In addition, the CTS frame may be transmitted simultaneously in multi-links.

The remaining PPDU may be transmitted using multi-links. In this case, the end time of the transmission/reception operation of the remaining PPDU may be earlier than the end time of the original TXOP. That is, a remaining period may occur in the original TXOP. The communication node (e.g., access point, station) may use the remaining period for transmission of another packet (e.g., PPDU). The remaining period in the TXOP may be used by the station. In this case, the station may configure the end time of the transmission operation in the transmission step of the CTS frame and/or the BA frame to be the end time of the original TXOP. In addition, the station may set a more data field included in a MAC header (e.g., QoS Data MAC header) of the BA frame to 1. The station may transmit data (e.g., additional PPDU) after a SIFS from the transmission end time of the BA frame. The station may configure the BA frame and the additional PPDU as one A-MPDU, and may transmit a PPDU including the one A-MPDU.

The remaining period in the TXOP may be used by the access point. In this case, the access point may configure the end time of the transmission operation in the transmission step of the RTS frame to be the end time of the original TXOP. The access point may transmit an additional PPDU to the station or another station after a SIFS from the reception end time of the BA frame. Alternatively, the access point may trigger the uplink transmission operation of the station(s) by transmitting a trigger frame after a SIFS from the reception end time of the BA frame.

Figure 13:
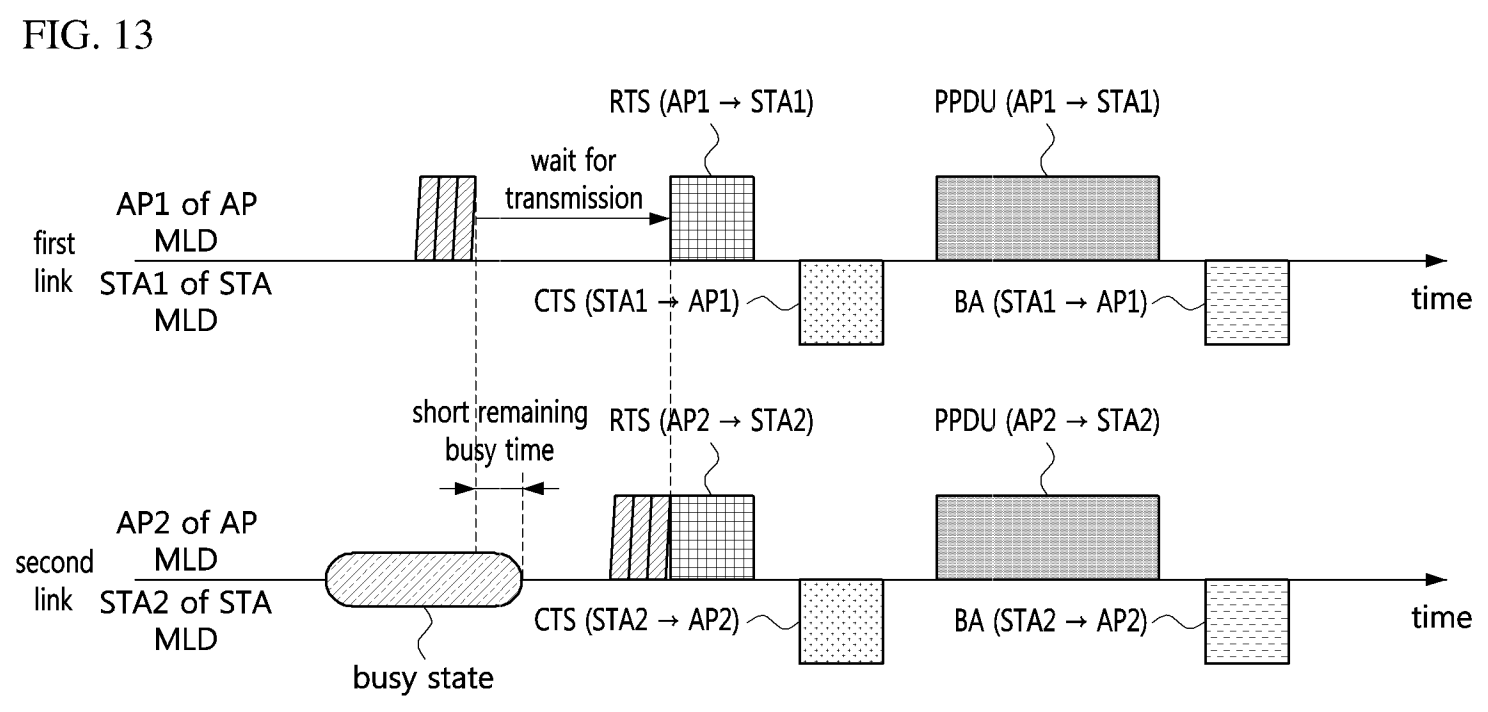

FIG. 13 is a timing diagram illustrating a fifteenth exemplary embodiment of a method of transmitting and receiving a data frame in a wireless LAN system supporting multi-links.

Referring to FIG. 13, RTS frames may be simultaneously transmitted for data transmission in multi-links. When a remaining busy time in the second link is short when a channel access operation is successful in the first link, the RTS frames may be simultaneously transmitted in multi-links. The remaining busy time may be identified based on a value of a duration field included in a header of the frame. When a condition 'remaining busy time <remaining backoff time+transmission time of RTS frame' is satisfied, the RTS frames may be transmitted at the same time. When the above-described condition is satisfied and the channel access operation is successfully completed in the first link, the access point may wait without transmitting the RTS frame in the first link until the channel access operation is completed in the second link. When the channel access operation is successfully completed in the second link, the access point may simultaneously transmit the RTS frames in the first link and the second link.

Figure 14:
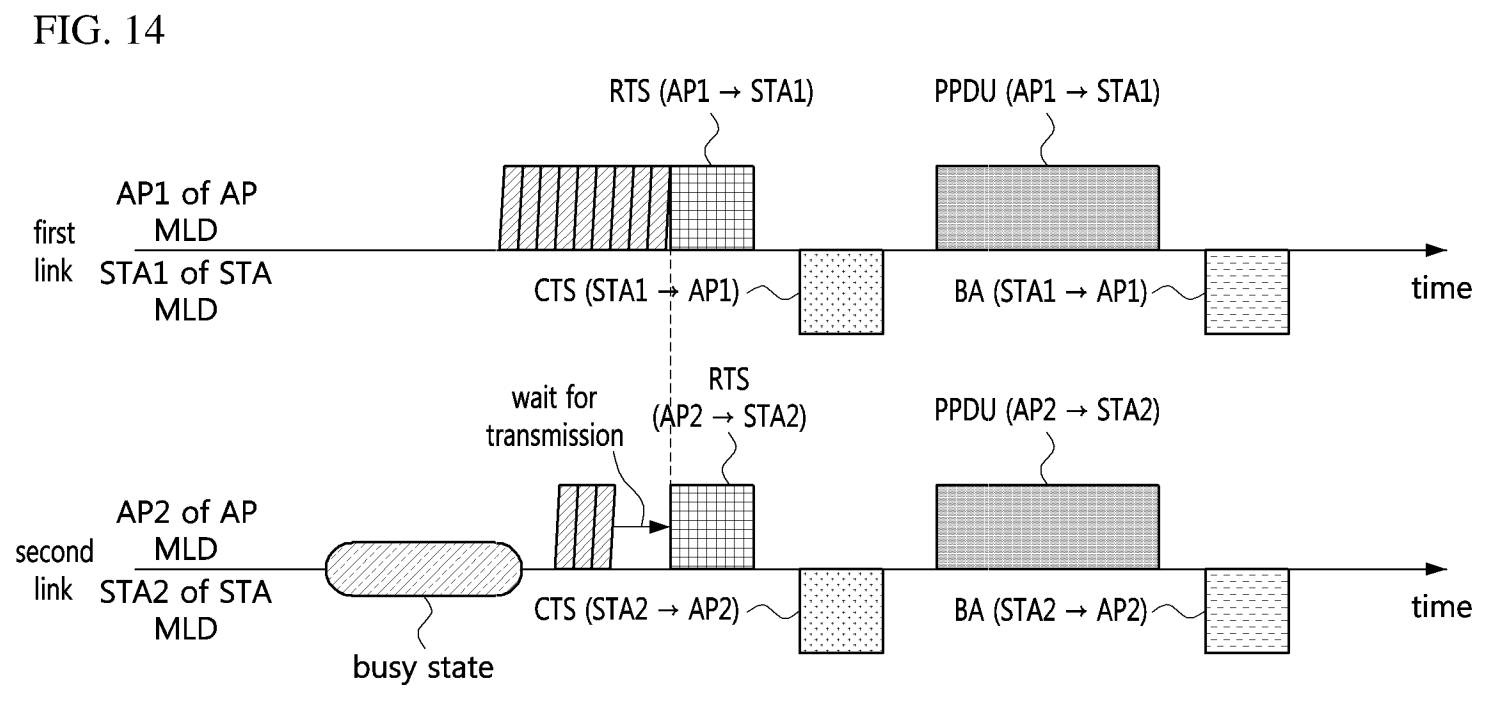

FIG. 14 is a timing diagram illustrating a sixteenth exemplary embodiment of a method of transmitting and receiving a data frame in a wireless LAN system supporting multi-links.

Referring to FIG. 14, the access point may successfully complete the channel access operation in the first link. In this case, the access point may transmit an RTS frame in the first link. Also, the access point may perform a channel access operation in the second link. The channel access operation in the second link may be completed before a transmission time of the RTS frame in the first link. In this case, the access point may wait for transmission of an RTS frame in the second link, and may simultaneously transmit the RTS frames in the first link and the second link when the channel access operation is completed in the first link.

Figure 15:
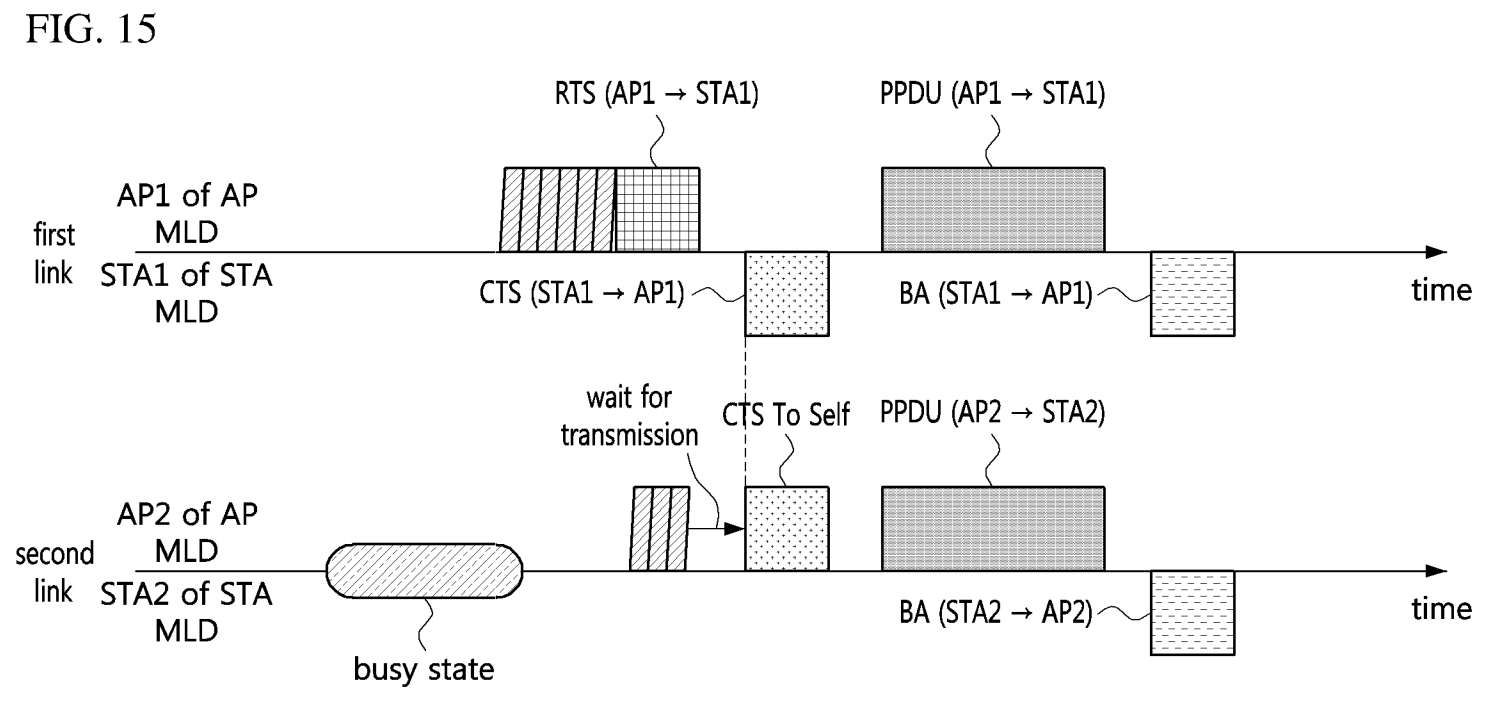

FIG. 15 is a timing diagram illustrating a seventeenth exemplary embodiment of a method of transmitting and receiving a data frame in a wireless LAN system supporting multi-links.

Referring to FIG. 15, the access point may successfully complete the channel access operation in the first link. In this case, the access point may transmit an RTS frame in the first link. Also, the access point may perform a channel access operation in the second link. The channel access operation in the second link may be completed before a transmission time of a CTS frame in the first link. In this case, the access point may wait for transmission in the second link, and may transmit a CTS-to-Self frame through the second link at a time of the transmission of the CTS frame in the first link. The transmission time of the CTS frame in the first link may be the same as the transmission time of the CTS-to-Self frame in the second link. In addition, the access point may receive the CTS frame from the station in the first link. The access point may simultaneously transmit data (e.g., PPDU) in the first link and the second link after a SIFS from the reception end time of the CTS frame.

Figure 16A:
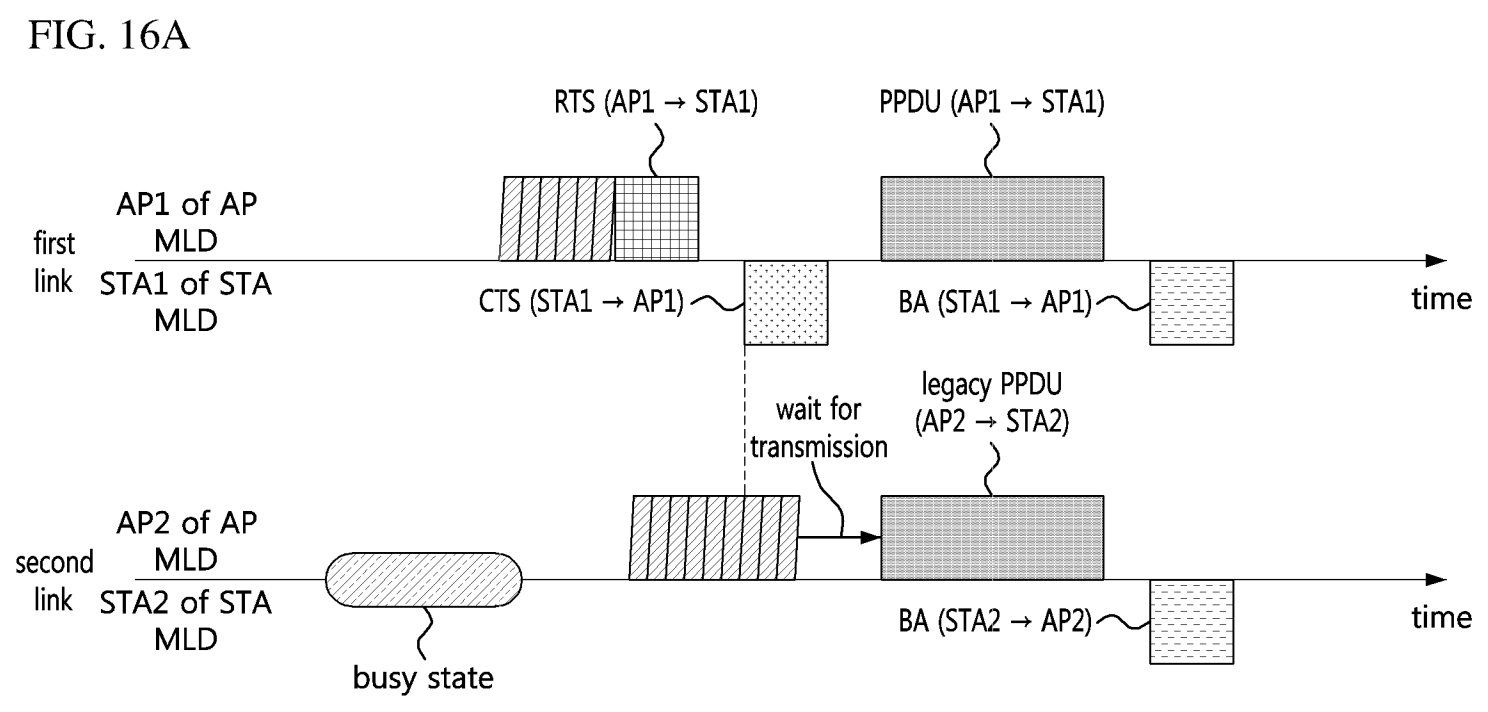
Figure 16B:
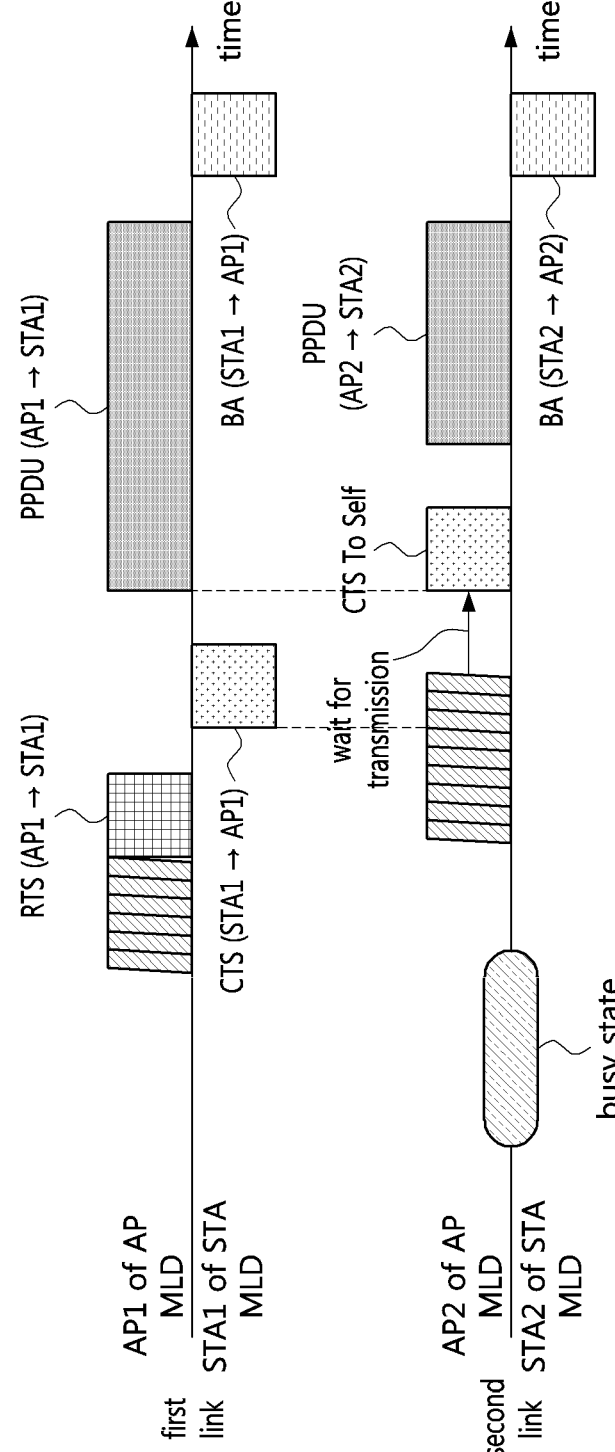
FIG. 16B is a timing diagram illustrating a nineteenth exemplary embodiment of a method of transmitting and receiving a data frame in a wireless LAN system supporting multi-links.

FIG. 16A is a timing diagram illustrating an eighteenth exemplary embodiment of a method of transmitting and receiving a data frame in a wireless LAN system supporting multi-links, and FIG. 16B is a timing diagram illustrating a nineteenth exemplary embodiment of a method of transmitting and receiving a data frame in a wireless LAN system supporting multi-links.

Referring to FIGS. 16A and 16B, the access point may successfully complete the channel access operation in the first link. In this case, the access point may transmit an RTS frame in the first link. Also, the access point may perform a channel access operation in the second link. The channel access operation in the second link may be completed between a transmission time of a CTS frame and a transmission time of a data frame (e.g., PPDU) in the first link. In this case, the access point may wait for transmission in the second link, and may transmit a data frame through the second link at a time of the transmission of the data frame in the first link.

The data frame transmission operation in the second link may be performed based on Scheme 1 or Scheme 2 below. In Scheme 1, the data frame transmitted in the second link may be a Non-High Throughput (Non-HT) PPDU having a legacy preamble. A coding operation for the legacy preamble may be performed using the lowest MCS. Therefore, transmission of the legacy frame may cover a wide area, and the station(s) may set NAV(s) by receiving the legacy frame. In Scheme 2, the access point may transmit a CTS-to-Self frame in the second link, and may transmit a PPDU according to IEEE 802.11be after a SIFS from the transmission time of the CTS-to-Self frame. The CTS-to-Self frame may include a legacy preamble, and the station(s) may set the NAV(s) by receiving the CTS-to-Self frame.

Figure 17:
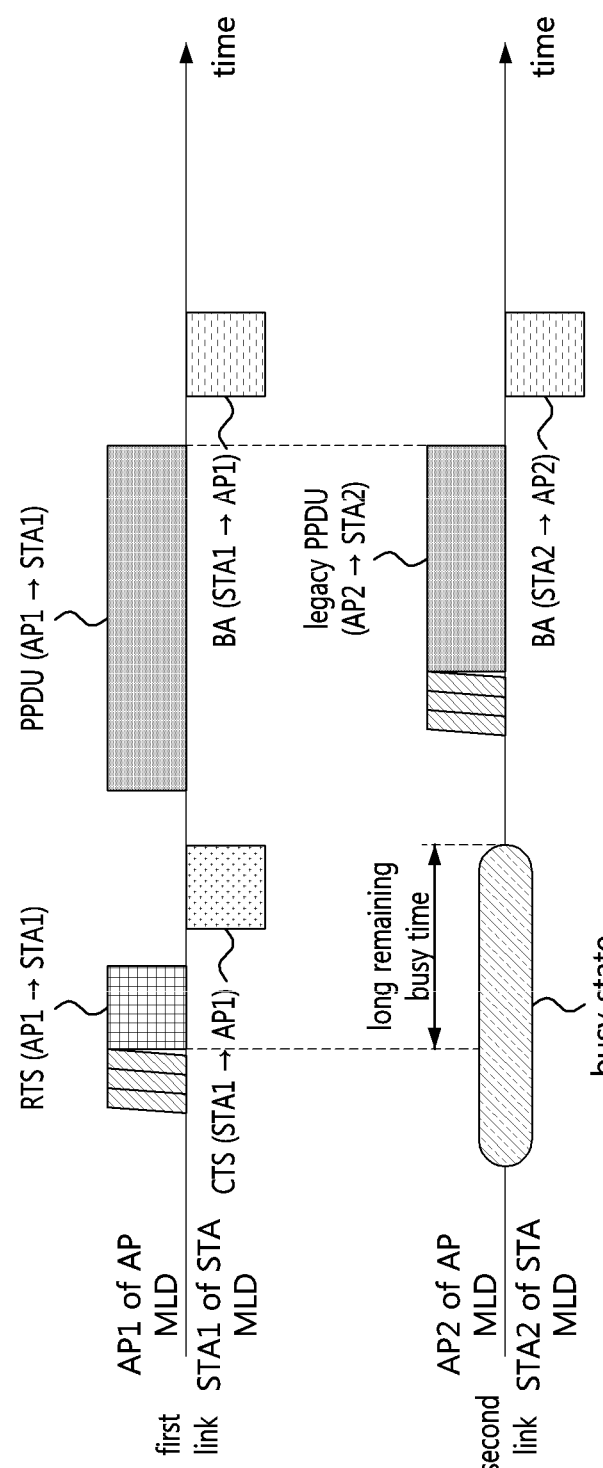
FIG. 17 is a timing diagram illustrating a twentieth exemplary embodiment of a method of transmitting and receiving a data frame in a wireless LAN system supporting multi-links.

FIG. 17 is a timing diagram illustrating a twentieth exemplary embodiment of a method of transmitting and receiving a data frame in a wireless LAN system supporting multi-links.

Referring to FIG. 17, the access point may successfully complete the channel access operation in the first link. In this case, the access point may transmit an RTS frame in the first link and may receive a CTS frame from the station in response to the RTS frame. When the CTS frame is received, the access point may transmit a data frame to the station in the first link. Also, the access point may perform a channel access operation in the second link. The channel access operation in the second link may be completed after a transmission time of a data frame in the first link. In this case, the access point may transmit the data frame without performing an RTS-CTS operation in the second link. The data frame transmitted in the second link may be a Non-HT PPDU or a PPDU according to IEEE 802.11be.

Figure 18:
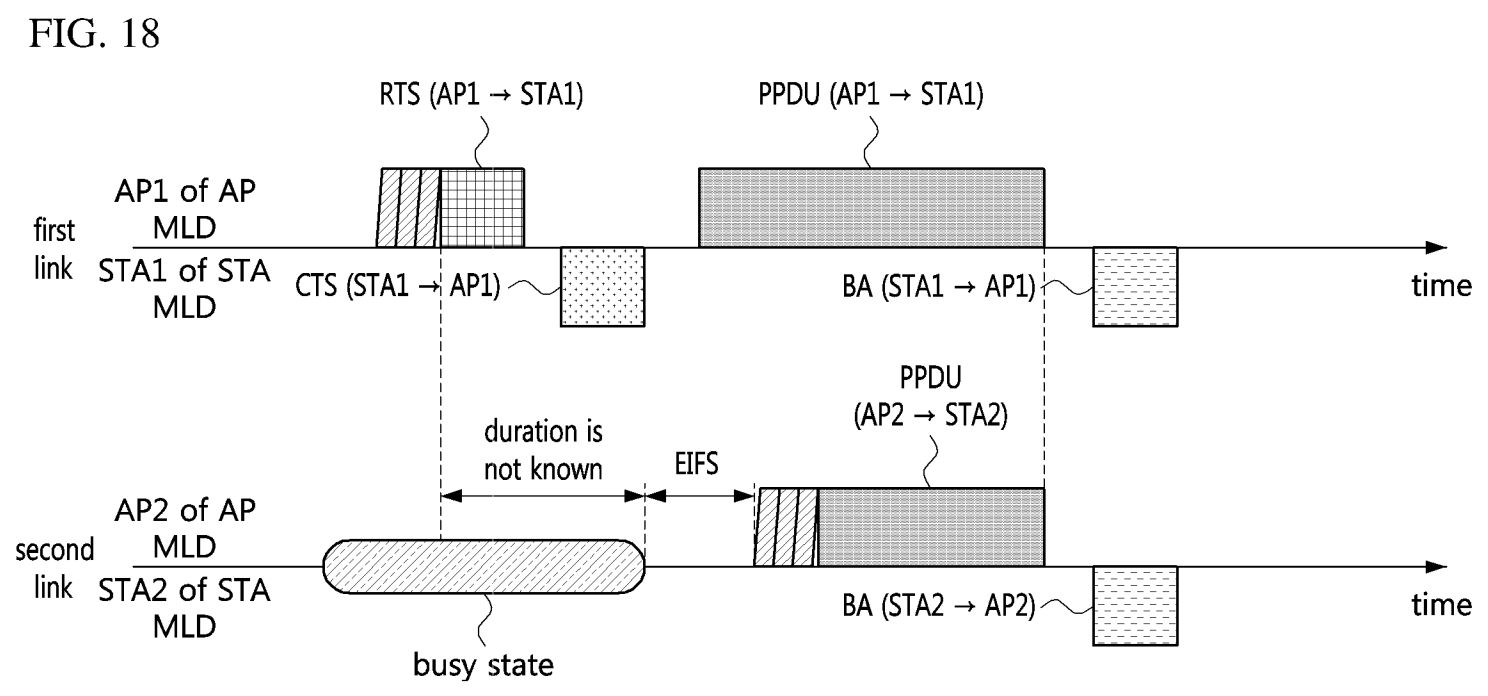

FIG. 18 is a timing diagram illustrating a twenty-first exemplary embodiment of a method of transmitting and receiving a data frame in a wireless LAN system supporting multi-links.

Referring to FIG. 18, the access point may successfully complete the channel access operation in the first link. In this case, the access point may transmit an RTS frame in the first link and may receive a CTS frame from the station in response to the RTS frame. When the CTS frame is received, the access point may transmit a data frame to the station in the first link. Also, the access point may perform a channel access operation in the second link. The access point may operate depending on an energy detection (ED) operation when an end time of a busy state in the second link is not known. Accordingly, the access point may perform a channel access operation after an EIFS (or PIFS) from the end time of the busy state in the second link. The EIFS may be longer than PIFS or AIFS. The EIFS may be used to ensure transmission and reception operations of a data frame. When the channel access operation is successfully completed in the second link, the access point may transmit a data frame in the second link. The data frame transmitted in the second link may be a Non-HT PPDU or a PPDU according to IEEE 802.11be.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a first device using multi-links in a wireless LAN, the operation method comprising:

transmitting a first request-to-send (RTS) frame to a second device in a first link among the multi-links;

receiving a first clear-to-send (CTS) frame from the second device in the first link, the first CTS frame being a response to the first RTS frame;

in response to reception of the first CTS frame, transmitting a first data frame to the second device in the first link; and transmitting, without an RTS-CTS operation, a second data frame to the second device in a second link among the multi-links while the second device is in a receiving state after completing a channel access operation in the second link among the multi-links, wherein a length of one data frame of the first data frame and the second data frame is adjusted such that an end time of the first data frame and an end time of the second data frame are identical.

2. The operation method according to claim 1, wherein the second device does not support simultaneous transmit and receive (STR) operations.

3. The operation method according to claim 1, wherein padding is added to the one data frame or a length of the one data frame is shortened such that the end time of the first data frame and the end time of the second data frame are identical.

4. The operation method according to claim 1, further comprising transmitting a CTS-to-self frame to the second device in the second link before the transmission of the second data frame, wherein a transmission time of the CTS-to-self frame is after the second device is in the receiving state after transmitting the first CTS frame.

5. The operation method according to claim 1, wherein the channel access operation includes a backoff operation.

6. An operation method of a first device using multi-links in a wireless LAN, the operation method comprising:

performing a first channel access operation in a first link among the multi-links;

performing a second channel access operation in a second link among the multi-links;

when the second channel access operation is completed before completion of the first channel access operation and a second device supports a non-simultaneous transmit and receive (NSTR) operation, waiting for transmission of a first request-to-send (RTS) frame to the second device in the second link;

when the first channel access operation is completed, transmitting the first RTS frame in the second link and a second RTS frame in the first link to the second device at the same time;

receiving a first clear-to-send (CTS) frame and a second CTS frame from the second device in the second link and the first link, the first CTS frame being a response to the first RTS frame and the second CTS frame being a response to the second RTS frame; and when the first CTS frame and the second CTS frame are received, transmitting data frames to the second device in the first link and the second link at a same time, wherein a length of one data frame of the data frames is adjusted such that end times of the data frames are identical.

7. The operation method according to claim 6, wherein padding is added to the one data frame or a length of the one data frame is shortened such that the end times of the data frames are identical.

8. The operation method according to claim 6, wherein each of the first channel access operation and the second channel access operation includes a backoff operation.

\* \* \* \* \*